(12) United States Patent
Tseng et al.

(10) Patent No.: US 12,352,608 B2
(45) Date of Patent: Jul. 8, 2025

(54) AUGMENTED TELEMETRY USING COUPLED MAGNETIC RESONANCES

(71) Applicant: The Regents of the University of California, Oakland, CA (US)

(72) Inventors: Peter Tseng, Irvine, CA (US); Amirhossein Hajiaghajani, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 156 days.

(21) Appl. No.: 18/021,763

(22) PCT Filed: Aug. 20, 2021

(86) PCT No.: PCT/US2021/046955
§ 371 (c)(1),
(2) Date: Feb. 16, 2023

(87) PCT Pub. No.: WO2022/046563
PCT Pub. Date: Mar. 3, 2022

(65) Prior Publication Data
US 2023/0314181 A1     Oct. 5, 2023

Related U.S. Application Data

(60) Provisional application No. 63/069,033, filed on Aug. 22, 2020.

(51) Int. Cl.
*G01D 5/22* (2006.01)
*G01D 21/00* (2006.01)
(Continued)

(52) U.S. Cl.
CPC ............... *G01D 5/22* (2013.01); *H04B 5/24* (2024.01); *H04B 5/26* (2024.01); *H04B 5/263* (2024.01); *G01D 21/00* (2013.01)

(58) Field of Classification Search
CPC .. H02J 50/10; H02J 50/12; H02J 50/80; H02J 50/90; H02J 2310/23; H04B 5/79;
(Continued)

(56) References Cited

U.S. PATENT DOCUMENTS 5,365,173 A    11/1994  Zou et al.
7,551,058 B1   6/2009   Johnson et al.
(Continued)

OTHER PUBLICATIONS

Baldi, Choi, Ziaie; A self-resonant frequency-modulated micromachined passive pressure transensor; IEEE Sensors Journal, vol. 3, No. 6, Dec. 2003, pp. 728-733.
(Continued)

*Primary Examiner* — Steven L Yeninas
(74) *Attorney, Agent, or Firm* — Chong IP Law Group

(57) ABSTRACT

Systems and methods for passive and/or active wireless sensor networks with augmented telemetry using coupled magnetic resonances in accordance with embodiments of the invention are disclosed. In one embodiment, a wireless sensor network is provided, the wireless sensor network comprising a transmitter configured to couple with a reader, a receiver configured to couple with a sensor, wherein the sensor is configured to detect at least one parameter and generate sensor data, wherein the sensor data maps onto the receiver, and wherein the transmitter and the receiver are inductively coupled creating a link between the reader and the sensor.

18 Claims, 23 Drawing Sheets

(51) Int. Cl.
*H04B 5/24* (2024.01)
*H04B 5/26* (2024.01)

(58) Field of Classification Search
CPC . H04B 5/24; H04B 5/26; H04B 5/263; H04B 5/266; H04B 5/72; A61B 5/002; A61B 5/0002; A61B 5/14532; A61B 5/14546; A61M 2205/3515; A61M 2205/3523; A61M 2205/3576; A61M 2205/3592
See application file for complete search history.

(56) References Cited

U.S. PATENT DOCUMENTS

| | | | |
|---|---|---|---|
| 10,734,697 B1 | 8/2020 | Tsironis | |
| 11,005,301 B1* | 5/2021 | Tillotson | H02J 50/80 |
| 2008/0278264 A1* | 11/2008 | Karalis | H02J 50/80 |
| | | | 307/104 |
| 2008/0281212 A1 | 11/2008 | Nunez et al. | |
| 2010/0148589 A1* | 6/2010 | Hamam | H02J 50/12 |
| | | | 307/104 |
| 2011/0040498 A1 | 2/2011 | Huang et al. | |
| 2012/0098348 A1* | 4/2012 | Inoue | B60L 50/61 |
| | | | 307/104 |
| 2012/0161696 A1 | 6/2012 | Cook et al. | |
| 2013/0310630 A1* | 11/2013 | Smith | A61M 60/538 |
| | | | 600/16 |
| 2014/0002111 A1 | 1/2014 | Potyrailo et al. | |
| 2014/0035358 A1* | 2/2014 | Ichikawa | B60R 16/03 |
| | | | 307/104 |
| 2015/0243432 A1* | 8/2015 | Laifenfeld | G01R 35/005 |
| | | | 324/601 |
| 2016/0012966 A1* | 1/2016 | Davis | H02J 50/12 |
| | | | 307/104 |
| 2017/0180009 A1 | 6/2017 | McManus et al. | |
| 2017/0214274 A1* | 7/2017 | Zhong | H01F 27/2804 |
| 2018/0316388 A1* | 11/2018 | Lee | H04B 5/263 |
| 2020/0012008 A1* | 1/2020 | Chen | G01L 9/14 |
| 2021/0119488 A1* | 4/2021 | Sit | H02J 50/12 |
| 2021/0265873 A1* | 8/2021 | Yoon | H01F 38/14 |
| 2021/0391754 A1* | 12/2021 | Smith | H02J 50/10 |
| 2022/0038136 A1* | 2/2022 | Cabrol | H04B 1/69 |
| 2023/0363735 A1* | 11/2023 | Cretu | H01F 38/14 |

OTHER PUBLICATIONS

Kurs, et al.; Wireless power transfer via strongly coupled magnetic resonances; Science vol. 317 Jul. 6, 2007, pp. 83-86.

Nopper, Has, Reindl; A wireless sensor readout system-circuit concept, simulation, and accuracy; IEEE Transactions on Instrumentation and Measurement, vol. 60, No. 8, Aug. 2011, pp. 2976-2983.

Sample, Meyer, Smith; Analysis, experimental results, and range adaptation of magnetically coupled resonators for wireless power; IEEE Transactions on Industrial Electronics, vol. 58, No. 2, pp. 544-554, Feb. 2011.

Sanz et al.; Passive resonators for wireless passive sensor readout enhancement; Appl. Phys. Lett. 103, 133502 (2013).

Tseng et al.; Functional, RF-Trilayer Sensors for Tooth-Mounted, Wireless Monitoring of the Oral Cavity and Food Consumption.

* cited by examiner

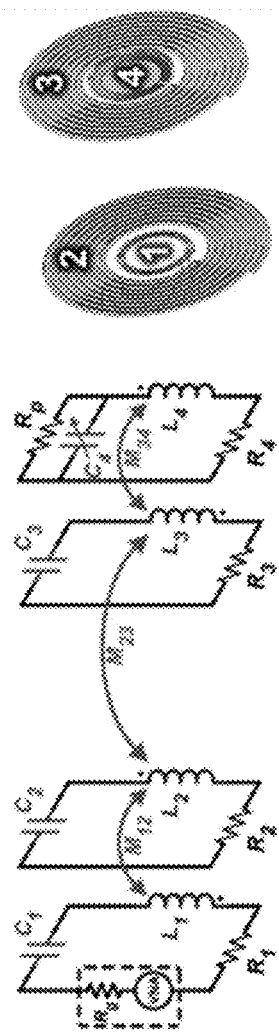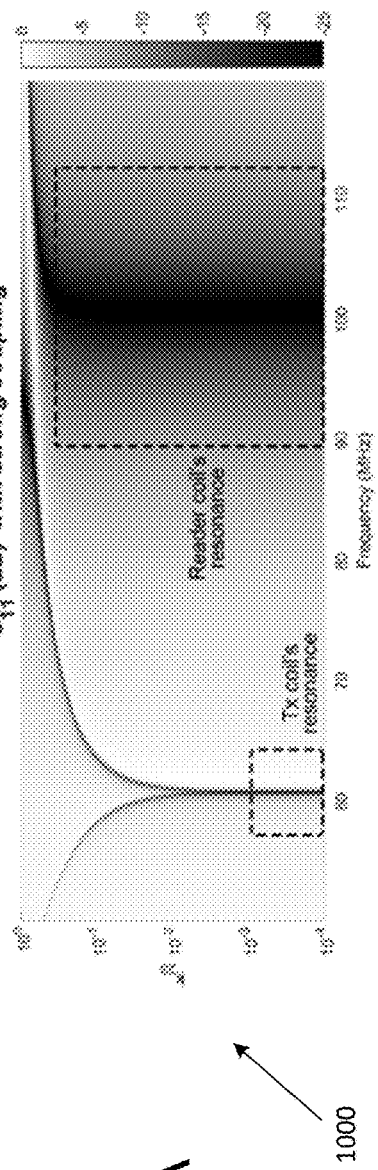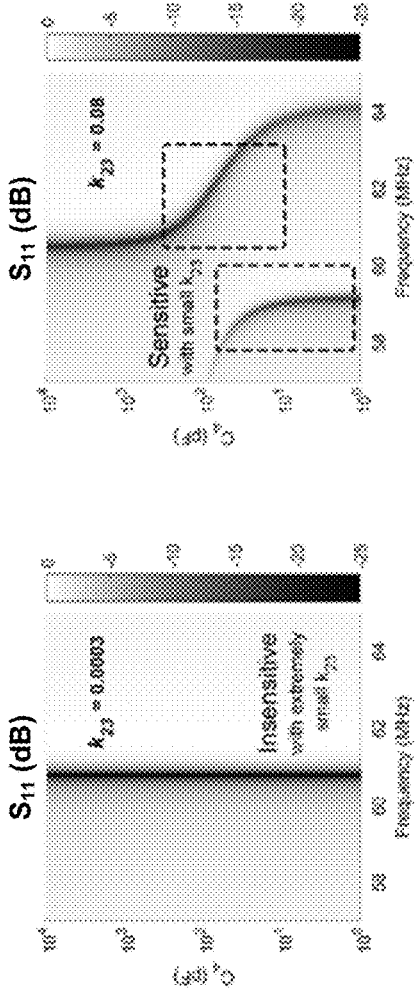
FIG. 10A
FIG. 10B

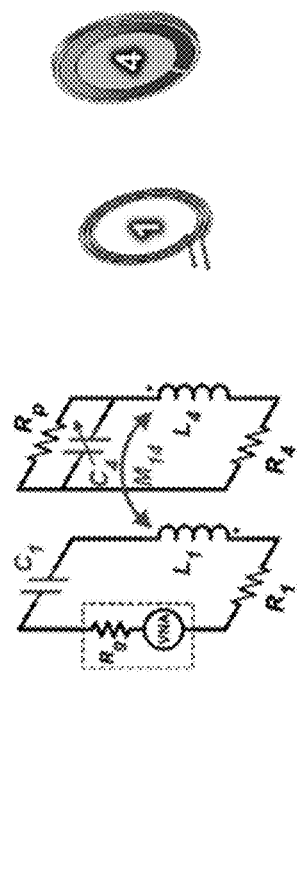
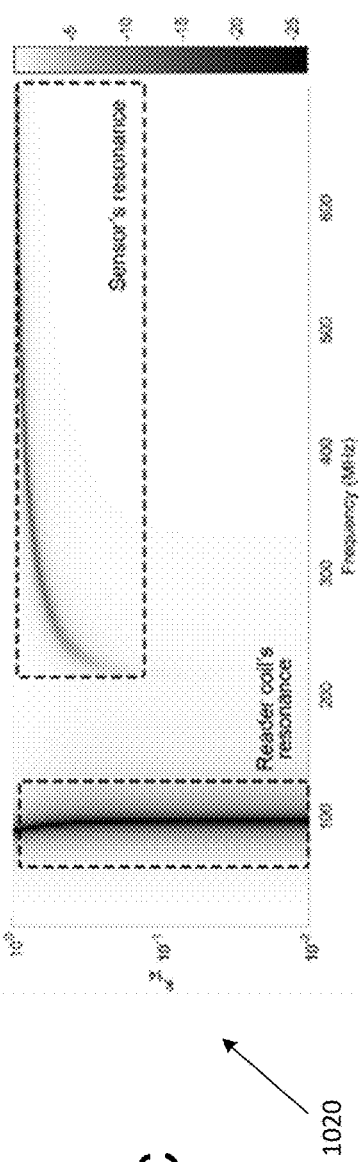
FIG. 10C
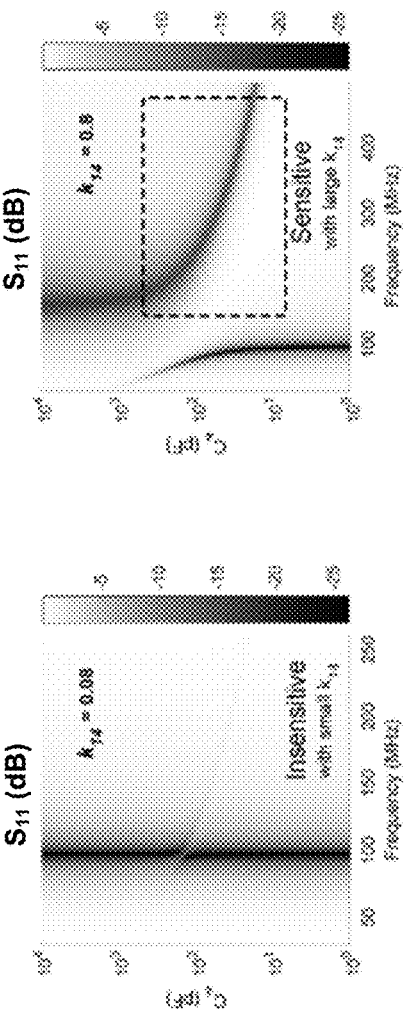
FIG. 10D

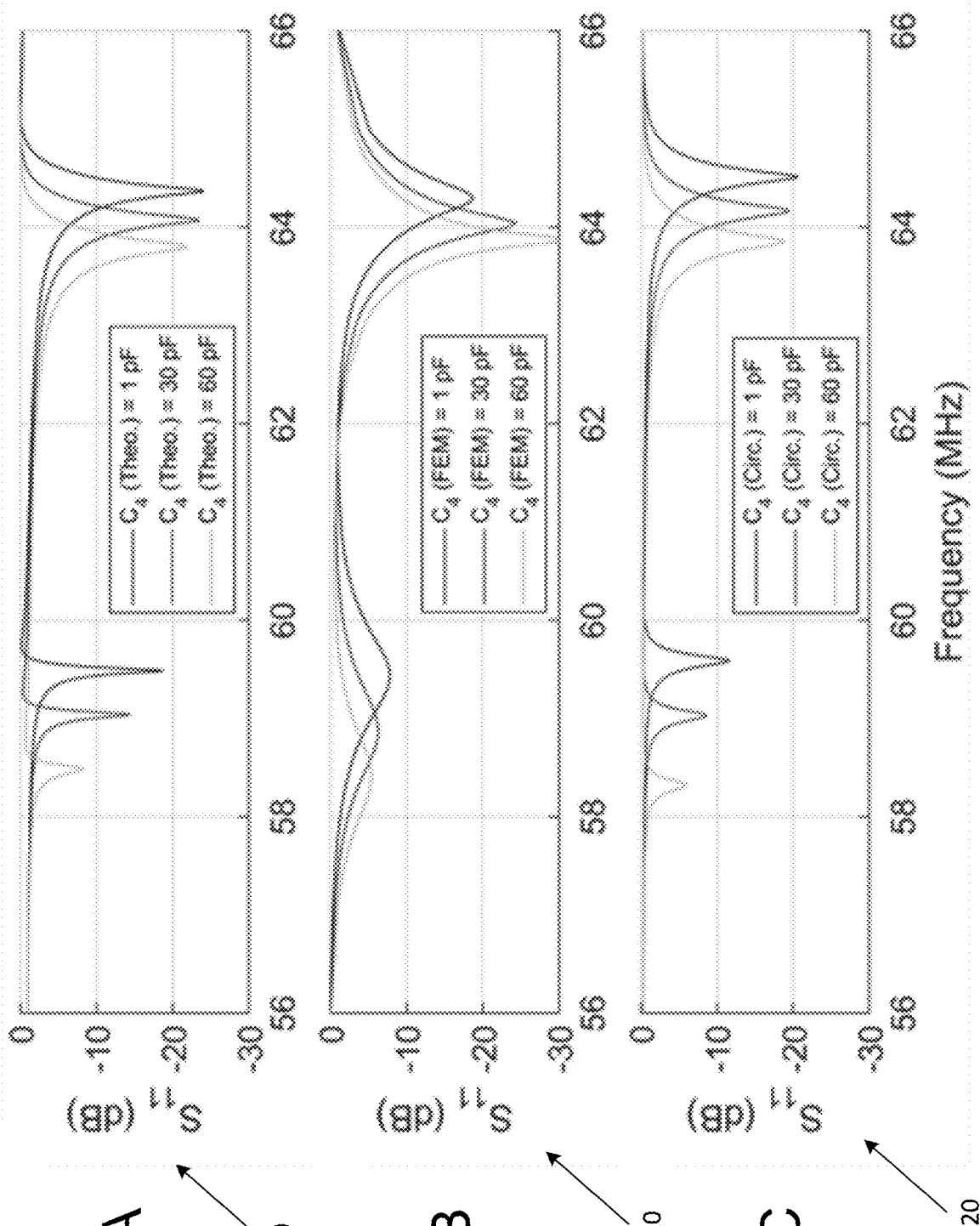

AUGMENTED TELEMETRY USING COUPLED MAGNETIC RESONANCES

CROSS-REFERENCE TO RELATED APPLICATIONS

The current application is a National Stage of International Application No. PCT/US21/46955, filed on Aug. 20, 2021, which claims priority to U.S. Provisional Patent Application No. 63/069,033, filed on Aug. 22, 2020, the disclosures of which are incorporated herein by reference.

FEDERAL FUNDING SUPPORT

This invention was made with Government support under Grant No. ECCS-1942364, awarded by the National Science Foundation (NSF). The Government has certain rights in the invention.

FIELD OF THE INVENTION

The present invention generally relates to wireless communications and more specifically to wireless sensor networks with augmented telemetry using coupled magnetic resonances.

BACKGROUND

Passive wireless sensors may play a significant role in a variety of modern environmental sensing schemes. For example, this may include applications ranging from implantable sensors to body area networks, and applications as dispersed sensors within an internet of things ("IOT") systems.

Wearable or implantable biosensors (may be referred to collectively as "biosensors") are often designed to monitor health indicators and may be placed directly on the skin or implanted within the body, whose response may be hard to access continuously during daily routine.

SUMMARY OF THE INVENTION

The various embodiments of the present passive and/or active wireless sensor networks with augmented telemetry using coupled magnetic resonances (may also be referred to collectively as a "magnetically coupled resonance system" or "inductively coupled resonance system") contain several features, no single one of which is solely responsible for their desirable attributes. Without limiting the scope of the present embodiments, their more prominent features will now be discussed below. In particular, the present augmented telemetry using coupled magnetic resonances will be discussed in the context of passive wireless sensor networks. However, the use of passive networks are merely exemplary and various other wireless networks, including but not limited to active wireless networks, may be utilized for augmented telemetry using coupled magnetic resonances as appropriate to the requirements of a specific application in accordance with various embodiments of the invention. Further, the use of particular biosensors and/or biosensor networks are also merely exemplary and various other sensors and/or wireless networks, including but not limited to implantable sensors, body area networks, dispersed sensors within IOT systems, and/or various sensors within a variety of wireless networks (e.g., wireless local area networks, wireless wide area networks, wireless metropolitan area networks, wireless personal area networks, ad-hoc networks, hybrid networks, etc.) may be utilized for augmented telemetry using coupled magnetic resonances as appropriate to the requirements of a specific application in accordance with various embodiments of the invention. After considering this discussion, and particularly after reading the section entitled "Detailed Description," one will understand how the features of the present embodiments provide the advantages described here.

One aspect of the present embodiments includes the realization that a passive wireless sensor may include a coupled inductor-resistor-capacitor ("LRC") resonant structure that may exhibit a characteristic spectral response that may depend on an impedance of circuit components. Typically, a passive wireless sensor may be rendered sensitive to environmental signals when one or more of the circuit elements modulates with a perturbation of one or more physical and/or chemical stimuli. For example, a coupled piezoresistive element may make the resonator sensitive to strain, while coupled so-called smart dielectric materials may make the resonant frequency of a resonator shift with chemical signals such as, but not limited to, hydrogen ions and/or glucose. Further, the spectral response of a coupled LRC resonant structure may be monitored remotely via an inductive coupling to a readout coil connected to a vector network analyzer ("VNA"). This capability typically allows for the passive and wireless nature of such sensors, and a significant advantage of passive wireless sensors is that no microelectronics may be required at the sensing node to form a fully operating sensing system.

Another aspect of the present embodiments includes the realization that current active and/or passive wireless sensor systems, other than the present embodiments, may have a number of significant limitations that limited utilization in many practical systems. For example, wireless performance of such passive sensors may directly rely on the inductive coupling (may also be referred to as "magnetic coupling") and the distance between the sensor and reader nodes. The acceptable performance distance between the sensor and reader nodes (may be referred to as the "readout distance") may be limited to a few millimeters in many sensors such as in passive radiofrequency identification ("RFID") enabled and parity-time symmetry induced displacement sensors to ensure that the wireless link works reliably and that there is an adequate magnitude response induced by the sensor in the readout coils. The limited readout distance range may be a critical drawback in the functionality of active and/or passive wireless sensors and may be particularly important in biosensors. Enhancing and improving the range of sensor readout has long been a challenge in passive wireless biosensing systems. The present embodiments advantageously enable sensor responses that may be measured from longer ranges improving the ease of sensor measurement, and relax constraints on where a sensor and readout nodes may be placed in relation to each other, as further described below. Although range enhancement may potentially be achieved using radio frequency ("RF") transmitters, RF transmitters rely on battery-powered active electronics with a limited lifetime that pose biocompatibility challenges, or may not be wireless. In addition, although repeaters may extend the readout range for few additional millimeters, repeaters would generally be placed in between the reader and sensor nodes and create extra mechanical support. Additionally, repeaters do not solve the problem that microelectronic components must remain closely coupled to the sensing node. The present embodiments provide these advantages and enhancements, as described below.

Another aspect of the present embodiments includes the realization that in current active and/or passive wireless sensor systems, other than the present embodiments, sensor systems are incapable of decoupling reader-sensor distance from sensing performance. Such systems, other than the present embodiments, have been investigated using parity-time circuit-systems by incorporating active gains to measure distance; however, such systems have not been able to retrieve environmental behavior from a sensor at the same time. Such systems, other than the present embodiments, generally possess arduous tuning challenges, in addition to active microelectronics of high complexity to achieve responses that exhibit low signal-to-noise ("SNR") ratio. Measurement of wireless environmental sensors, other than the present embodiments, relies on the inductive coupling quality, and effectively requires an unchanging reader-sensor distance to maintain consistent functionality. Such constraints come at considerable costs to the usability and practical viability of the system.

Another aspect of the present embodiments includes the realization that, in current active and/or passive wireless sensor systems other than the present embodiments, sensors exhibit fundamental trade-offs in size and spectral performance. For example, miniature passive sensors (for use in space-limited settings such as the body) exhibit high resonant frequencies that may require ultra-wideband measurement and are often out of the operating frequency range of conventional VNAs. This may be particularly true for sensors that use simple handheld measurement equipment that is even more limited than traditional VNAs. Generating electrically small resonators remains a significant challenge and limits both the implantation position and size of such sensors. The limitations of readout tools may also place a significant constraint on sensor design, precluding small sensor sizes and sensor presence in constrained environments. The resonance frequency of such sensors may be lowered by using dielectrics of high permittivity (such as hydrogels); however, such sensors generally suffer from conductive loss and possess low quality factors. Manipulating the resonance frequency of micro-sized sensors may be a major consideration in microelectromechanical systems.

In a first aspect, a wireless sensor network is provided, the wireless sensor network comprising: a transmitter configured to couple with a reader; a receiver configured to couple with a sensor, wherein the sensor is configured to detect at least one parameter and generate sensor data, wherein the sensor data maps onto the receiver; and wherein the transmitter and the receiver are inductively coupled creating a link between the reader and the sensor.

In an embodiment of the first aspect, the transmitter comprises a transmitter coil and the receiver comprises a receiver coil.

In another embodiment of the first aspect, the reader comprises a coil and the reader and the transmitter coil are inductively coupled.

In another embodiment of the first aspect, the reader and the transmitter coil are inductively coupled with a coupling strength coefficient of $k_{12}$.

In another embodiment of the first aspect, the sensor comprises at least one circular ring and the receiver coil is further configured to receive the sensor inside of the receiver coil to inductively couple the sensor and the receiver coil.

In another embodiment of the first aspect, the sensor and the receiver coil are inductively coupled with a coupling strength coefficient of $k_{34}$.

In another embodiment of the first aspect, the transmitter coil and the receiver coil are configured coaxially.

In another embodiment of the first aspect, the transmitter coil and the receiver coil are inductively coupled via magnetic resonance.

In another embodiment of the first aspect, the inductive coupling of the transmitter coil and the receiver coil extends a range of the reader and the sensor.

In another embodiment of the first aspect, the inductive coupling of the transmitter coil and the receiver coil creates a low-loss channel.

In another embodiment of the first aspect, the transmitter coil and the receiver coil are inductively coupled with a coupling strength coefficient of $k_{23}$.

In another embodiment of the first aspect, the coefficient $k_{23}$ may be used to determine misalignment of the reader and the sensor.

In another embodiment of the first aspect, the coefficient $k_{23}$ may be used to determine distance between the reader and the sensor.

In another embodiment of the first aspect, the reader is a passive wireless resonator.

In another embodiment of the first aspect, the reader is connected to a vector network analyzer ("VNA").

In another embodiment of the first aspect, the sensor is an inductor-resistor-capacitor ("LRC") resonator and the sensor data comprises a spectrum of frequencies.

In another embodiment of the first aspect, the LRC resonator is configured to detect at least one chemical.

In another embodiment of the first aspect, the LRC resonator is configured to detect at least one physical stimulus.

In another embodiment of the first aspect, the sensor comprises a split-ring resonator.

In another embodiment of the first aspect, the split-ring resonator comprises a multifunctional material-under-test ("MUT") configured to detect at least one environmental parameter.

BRIEF DESCRIPTION OF THE DRAWINGS

The various embodiments of the present passive and/or active wireless sensor networks with augmented telemetry using coupled magnetic resonances now will be discussed in detail with an emphasis on highlighting the advantageous features. These embodiments depict the novel and non-obvious features of wireless sensor networks with augmented telemetry shown in the accompanying drawings, which are for illustrative purposes only. These drawings include the following figures:

FIG. 10A is a diagram illustrating frequency splitting in accordance with an embodiment of the invention.

FIG. 10B is a diagram illustrating sensitivity at different coupling coefficients in accordance with an embodiment of the invention.

FIG. 10C is a diagram illustrating frequency splitting for a conventional readout in accordance with an embodiment of the invention FIG. 10D is a diagram illustrating sensitivity at different coupling coefficients for a conventional readout in accordance with an embodiment of the invention.

FIGS. 11A-C illustrates a sensitivity comparison between a theoretical model, FED simulation, and a circuit analysis in accordance with an embodiment of the invention.

DETAILED DESCRIPTION OF THE DRAWINGS

Figure 1A:
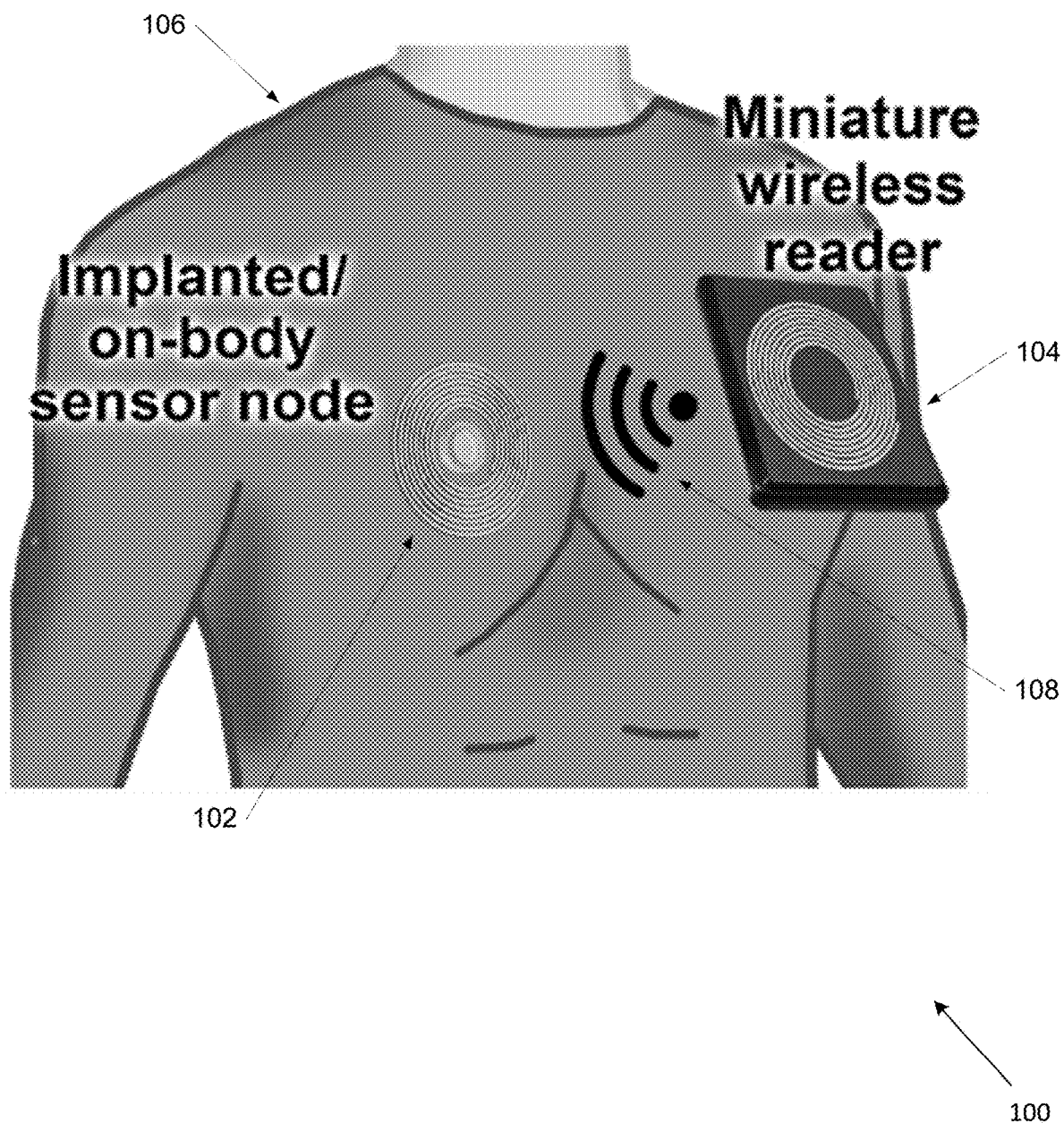
FIG. 1A illustrates a magnetically coupled resonance system in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, coupled magnetic resonances in passive wireless sensor telemetry are further described below. As described herein, wireless passive sensors are building blocks of modern environmental sensing schemes with numerous medical and/or industrial applications. However, these sensors may be hampered by numerous issues including, but not limited to, restrictive read-out distances due to nearfield coupling, fundamental tradeoffs in size/spectral performance, and/or unreliable sensor tracking. In many embodiments, unlike in conventional readout where the reader coil directly couples to an environmentally-sensitive resonator, a pair of reader- and sensor-coupled resonators may facilitate an extremely low-loss inductive link. This may allow for an efficient inductive link with enhancements in reader-sensor readout range compared to existing readout schemes (e.g., a 10-fold enhancement in reader-sensor readout range compared to existing readout schemes). In various embodiments, augmented telemetry using coupled magnetic resonances may be implemented without active microelectronics and may be utilized in existing passive wireless telemetric systems with minimal modification. In several embodiments, augmented telemetry using coupled magnetic resonances unbinds a user from a number of fundamental limitations to wireless sensing. For example, spectral behavior of the sensor maps onto that of the magnetically coupled resonator and untethers the sensor's spectral properties from its size overcoming the fundamental trade-off between the electrical size and frequency that limits the application of various sensors, and in particular, miniature sensors. As described further below, augmented telemetry using coupled magnetic resonances is demonstrated for illustrative purposes in-vivo using a receiver coil-modified fabric that enables long-range readout of epidermal RF pressure, moisture, and respiration sensors. In addition, unlike in existing schemes, such multi-spectral readout may enable decoupled co-readout of the sensor's distance as well as its status (illustrated herein for measuring human respiration and external pressure simultaneously) and may be utilized to eliminate monitoring disruptions incurred by unknown reader-sensor distance.

Wireless sensor networks with augmented telemetry using coupled magnetic resonances in accordance with embodiments of the invention are further discussed below.

Coupled Magnetic Resonance Systems

A novel and non-obvious family of passive wireless sensors with enhanced telemetry based on the coupled resonances of a chain of distanced self-resonators is illustrated. While direct inductive coupling between a reader coil and an LRC sensor may typically form a traditional wireless readout scheme, indirect sensor monitoring through the resonance of an Rx coil perturbed by a sensor is illustrated in accordance with embodiments of the invention. As described herein, coupled magnetic resonance systems may untether users from a number of fundamental limitations of traditional wireless sensing. In addition to an extended range (e.g., up to 6 times the radius of the sensor), coupled magnetic resonance systems may offer several powerful features including, but not limited to, the self-resonators being all passive elements that may readily intercede into current traditional readout systems with minor modifications. Further, any LRC sensor may be utilized within a coupled magnetic resonance system to monitor a variety of chemical and/or physical conditions. For example, as further described below, moisture and pressure sensors are utilized for demonstrative purposes. Furthermore, frequency splitting in an over coupled configuration may exhibit unique capabilities of enabling co-readout of a sensor's distance and status due to one resonant peak exhibiting sensitivity only to sensor behavior, and the other resonant peak to distance. As further described below, and to demonstrate some features, respiration and pressure may be measured with a single readout at long distance. In various embodiments, such features may be utilized to eliminate the traditional uncertainty of a sensor state rendered by unknown coupling strength and/or distance. Moreover, the high resonance frequency of LRC sensors is generally troublesome due to the small size of microsystems. Coupled magnetic resonance systems enable monitoring sensor behavior by mapping to Rx/Tx resonances at lower frequency bands, thus facilitating tracking by simple and/or low-cost monitoring devices. Integrating coupled magnetic resonance systems with simple and/or low-cost monitoring devices may redefine the monitoring standards of wireless sensors and enable integration in a variety of new applications and environments. Furthermore, coupled magnetic resonance systems may be combined with modified textiles and/or epidermal electronics, and be built into body area networks, or even be built into advanced microelectronic systems such as those locked at exceptional points. Moreover, coupled magnetic resonance systems may allow for probing a plurality of sensors (e.g., nearfield communication ("NFC") sensors) at once, at relatively long distance with a single reader (e.g., a single NFC reader), and disconnected NFC sensors.

Wireless sensor readout systems with enhanced telemetry using magnetic resonances (may also be referred to as "coupled magnetic resonance systems") are further described below. In many embodiments, a strong magnetic coupling may be utilized for enhancing passive wireless sensor readouts. A magnetically coupled resonance system in accordance with an embodiment of the invention is shown in FIG. 1A. The magnetically coupled resonance system 100 may include one or more sensor nodes 102 (may also be referred to as "sensor(s)") including, but not limited to a sensor 102 implanted on a body 106 (e.g., an implanted sensor node 102) and/or a sensor 102 placed on a body 106 (e.g., an on-body sensor node 102). In many embodiments, the coupled magnetic resonance system 100 may also include one or more readers 104 (may also be referred to as "reader node(s)" or "readout node(s)") including, but not limited to a wireless reader. As further described below, magnetic resonances may induce strong coupling between multiple resonators and create a path for transferring power to farther distances. In many embodiments, the sensor node 102 may include a passive resonator that may be inductively-coupled 108 (may also be referred to as "magnetically coupled") to a chain of resonators instead of being coupled directly to a reader 104, as further described below. Unlike parity-time sensors that may incorporate active gains, an approach based around strongly coupled magnetic resonances may be implemented using passive elements to monitor the sensor behavior.

As described further below, at a certain distance between the reader 104 and sensor node(s) 102, the resonant frequency splits, enabling monitoring of sensors 102 placed far from the reader 104 as compared to in conventional readout schemes. For example, experiments demonstrate a 10-fold enhancement in readout range. Powerfully, these multiple resonant frequencies may be used to retrieve both a distance of the sensor 102 from the readout node (e.g., reader 104), as well as to detect the state of the resonant sensor 102, as further described below. For example, in many embodiments, one peak may be sensitive to the sensor state, and another peak to sensor distance from the reader node 104. Such a capability may enable the measurement of sensors 102 with modulating lossy components irrespective of sensor distance. Further, the spectral responses of sensors 102 may be mapped on to the lower resonant frequency of the coupled magnetic resonances. This may enable low MHz readout irrespective of sensor size(s).

As further described below, wide-ranging performance enhancements may be driven by coupled magnetic resonances and will have powerful implications on passive wireless sensor telemetry. For example, sensors 102 may be integrated with inexpensive handheld monitoring systems, while becoming smaller and being implanted deeper in environments, such as, but not limited to, the human body 106. Further, as no complex microelectronic systems may be required (as in demonstrated techniques based around PT-symmetry), this approach integrates straightforwardly in a wide variety of existing sensor schemes, enabling new configurations in reader-sensor orientation and application.

An exemplary comparison of some capabilities of the current embodiments, in contrast with conventional schemes, is shown in Table S1, reproduced below:

TABLE S1

| | Comparison between recent advances in wireless readout systems: | | | |
|---|---|---|---|---|
| Characteristics | Coupled magnetic resonances | Conventional inductive link | Parity-time symmetry induced | RFID enabled |
| Operating distance range (times the radius of the sensor) | 6-8 | 0.5-1 | 1.5 | 0.2-0.5 |
| Potential operating frequency | >1 MHz (untethered from the sensor's resonance) | >300 MHz* (limited by the sensor's resonance) | >1 MHz | >50 MHz |

TABLE S1-continued

Comparison between recent advances in wireless readout systems:

| Characteristics | Coupled magnetic resonances | Conventional inductive link | Parity-time symmetry induced | RFID enabled |
|---|---|---|---|---|
| Minimum sensor size [cm] | Potentially unlimited** | 0.5-5 | 0.5-5 | 4-6 |
| Sensitivity ($\Delta f$/ $f_{central}$/perturbation) | 0.5 MHz/50 MHz/200 Pa = 50 MPa$^{-1}$ | 200 MHz/300 MHz/300 Pa = 2200 MPa$^{-1}$* 1 MHz/30 MHz/100 kPa = 0.33 MPa$^{-1}$ [20] | 60 MHz/200 MHz/10 kPa = 30 MPa$^{-1}$ [18] 16 kHz/1.5 MHz/2 mm = 5300 mm$^{-1}$ [28] | 95 MHz/50 MHz/10 k$\Omega$ = 190 M$\Omega^{-1}$ |
| Ability to retrieve sensor-reader distance | Yes | No (causing undetected frequency shifts) | No (causing undetected frequency shifts) Yes (but unable to detect sensor's status) | No |
| Microelectronic requirements | No active electronics required | No active electronics required | Active gain circuits required | Active Bluetooth/ NFC transmitter required |

Figure 1B:
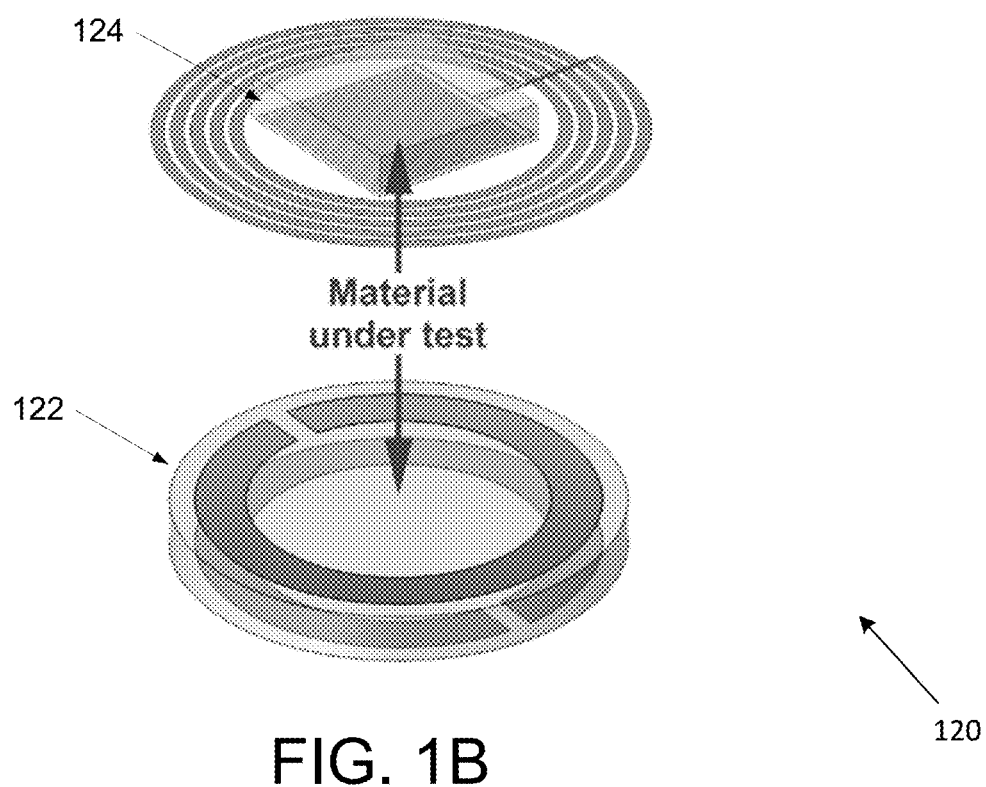
FIG. 1B illustrates a biosensor in accordance with an embodiment of the invention.

*For a typical pressure-sensitive resonator smaller than 3 cm in diameter.
**Enabled by mapping the sensor's resonance onto the epidermal coupled resonators A biosensor in accordance with an embodiment of the invention is shown in FIG. 1B. In many embodiments, the biosensor 120 may include an inter-digitated and/or split-ring resonator 122 integrated with a multifunctional material-under-test ("MUT") 124 sensitive to environmental parameters such as, but not limited to, pressure, glucose, alcohol, and/or temperature. In various embodiments, the biosensor(s) 120 may include, but is not limited to, "smart"-material integrated split-ring resonators (may also be referred to as "sensor-SRRs") may be utilized as the multifunctional sensing resonators. In a variety of embodiments, such constructs may be composed of SRR structures whose capacitance may be coupled to the behavior of designer environmentally-responsive materials (most commonly as the interlayer of the SRR). In several embodiments, environmentally-responsive materials may include, but is not limited to, a glucose-responsive hydrogel, biopolymer, compliant materials, etc.

Figure 1C:
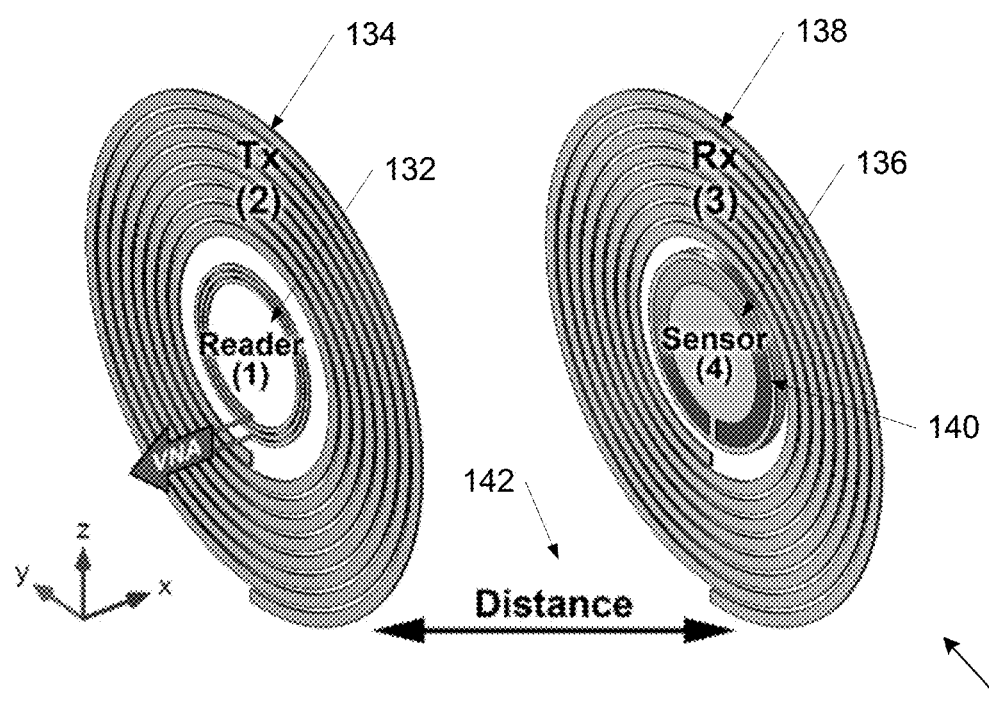
FIG. 1C is a diagram illustrating a system of coupled self-resonators interceding the reader-sensor arrangement (may also be referred to as a "coupled magnetic resonance system") in accordance with an embodiment of the invention.

A diagram illustrating a system of coupled self-resonators interceding the reader-sensor arrangement in accordance with an embodiment of the invention is shown in FIG. 1C. In contrast to the traditional readout, in which the reader antenna is typically inductively coupled to the passive wireless resonator (e.g., the sensor), in a magnetically coupled resonance system 130, the reader 132 (e.g., the 1$^{st}$ node) may be coupled to a closely placed transmitter coil 134 (may also be referred to as "Tx," "Tx coil," or "2$^{nd}$ node"). Similarly, the sensor 136 (e.g., the 4$^{th}$ node) may be closely coupled to the receiver coil 138 (may also be referred to as "Rx," "Rx coil," or "3$^{rd}$ node"). In many embodiments, a sensor node 136 may be an LRC resonator whose resonant frequency may be sensitive to a chemical (e.g., glucose concentration, pH, etc.) or physical stimulus such as pressure, temperature through the MUT, etc.

In further reference to FIG. 1C, the reader and Tx coils 132, 134 may be concentric coils both with radial pitch, and thus may be inductively coupled with a coupling strength of $k_{12}$. The coupling coefficient may vary from 0 to 1 (i.e., uncoupled to fully coupled). Similarly, the circular rings 140 of the sensor-SRR 136 may be placed inside and inductively coupled to the concentric Rx coil 138 (indicated by $k_{34}$). Further, the Tx and Rx coils 134, 138 may be placed coaxially and inductively coupled ($k_{23}$). In many embodiments, the Tx and Rx coils 134, 138 may be placed farther from each other relatively by a distance 142. As a result, the direct couplings in the reader- and Tx-sensors 132, 136 may be negligible.

Figure 1D:
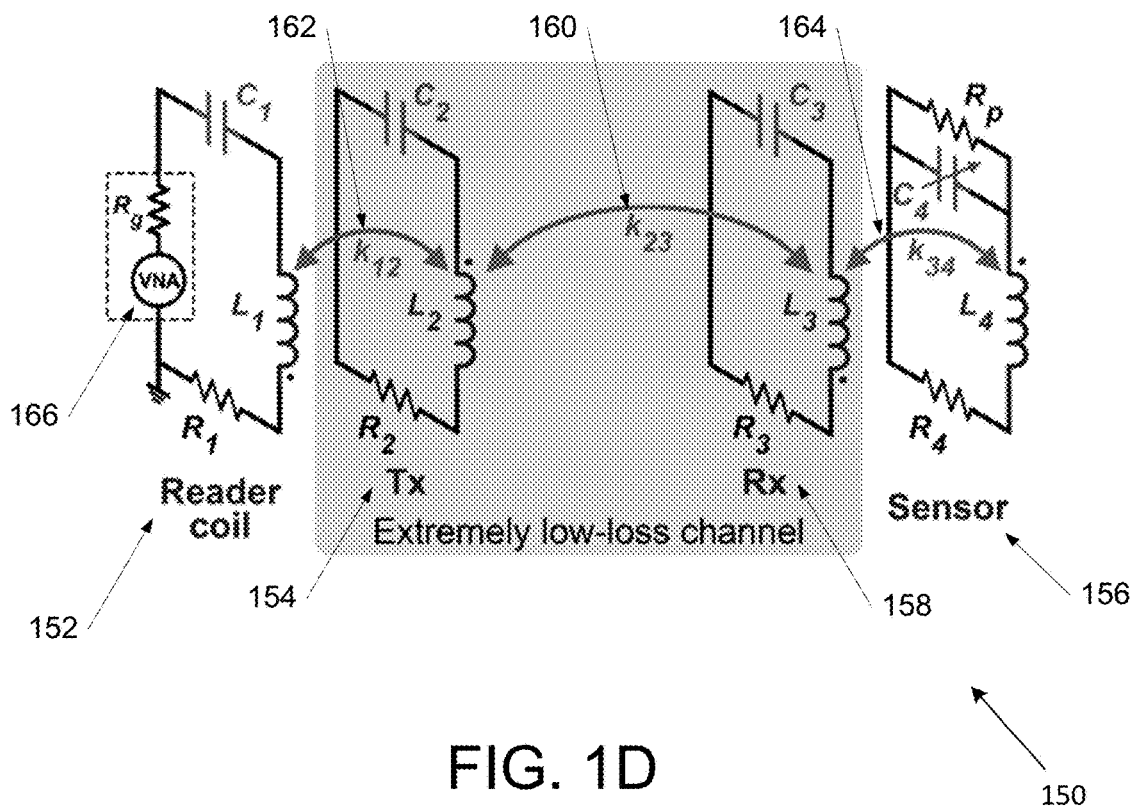
FIG. 1D illustrates an equivalent circuit of the magnetically coupled system [[of resonators]] in accordance with an embodiment of the invention.

An equivalent circuit of a magnetically coupled resonance system in accordance with an embodiment of the invention is shown in FIG. 1D. In many embodiments, the equivalent circuit 150 may include representations of a reader 152 (may also be referred to as "a reader coil") that may be coupled to a transmitter 154 (may also be referred to as "a transmitter coil") and a sensor 156 that may be coupled to a receiver 158 (may also be referred to as "a receiver coil"). In various embodiments, the $k_{23}$ 160 may be the effective link through the distanced elements, although it may yet be small. In some embodiments, the effective link may be an extremely low-loss channel. In this arrangement, $k_{12}$ 162 and $k_{34}$ 164 may be about an order of magnitude greater than $k_{23}$ 160. In several embodiments, the reader coil 152 may be connected to a VNA 166, and the reflection coefficient's magnitude $|S_{11}|$ may represent the resonant frequencies of the system. In effect, the system 150 may represent a modification of the traditional reader-sensor scheme wherein the coupled resonance of the Tx/Rx coils 154, 158 may be interceded, facilitating long range transmission between the reader 152 and sensor 158.

Figure 5:
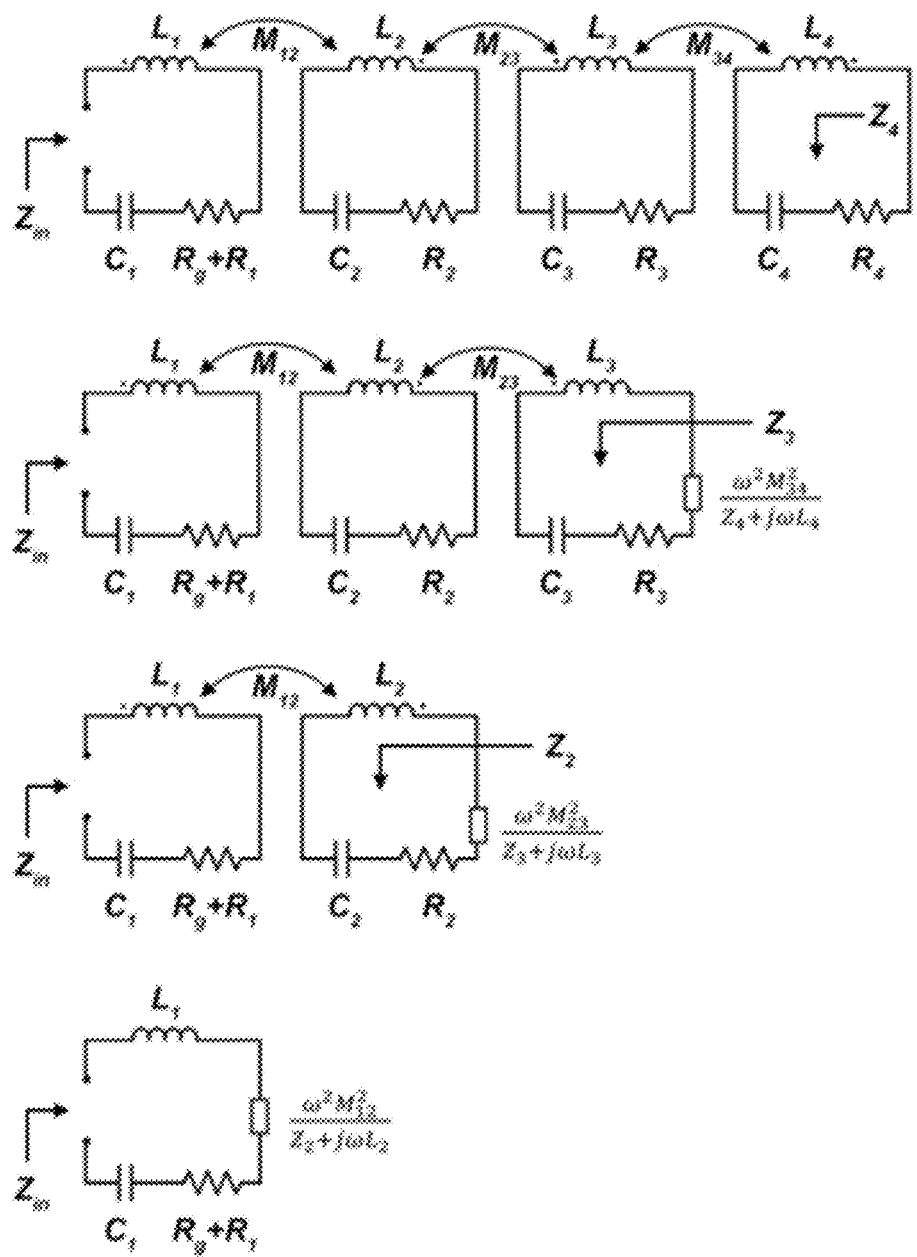
FIG. 5 illustrates a derivation of the input impedance using the impedance conversion in accordance with an embodiment of the invention.

According to the equivalent circuit, the input impedance seen from the VNA 166 may be calculated by:

$$Z_{in} = R_1 + R_g + j\omega L_1 - \frac{j}{\omega C_1} + \cfrac{\omega^2 M_{12}^2}{R_2 + j\omega L_2 - \cfrac{j}{\omega C_2} + \cfrac{\omega^2 M_{23}^2}{R_3 + j\omega L_3 - \cfrac{j}{\omega C_3} + \cfrac{\omega^2 M_{34}^2}{R_4 + j\omega L_4 - \cfrac{jR_p}{\omega C_4\left(R_p - \cfrac{j}{\omega C_4}\right)}}}} \quad (1)$$

where $R_i$, $L_i$ and $C_i$ are the serial resistance, inductance, and parasitic capacitance in the $i^{th}$ loop, respectively, depending on the geometry of the loops. The mutual inductance between the $x^{th}$ and $y^{th}$ loops is shown by $M_{xy}$ ($=k_{xy}\sqrt{L_xL_y}$). At the sensor's node, $R_p$ represents the MUT's dielectric loss and $\omega$ is the angular frequency. The reflection coefficient may be calculated from the input impedance ($S_{11}=(Z_{in}-R_g)/(Z_{in}+R_g)$) where $R_g$ is the internal impedance of the VNA 166. A derivation of the input impedance using the impedance conversion in accordance with an embodiment of the invention is shown in FIG. 5.

Aside from the input impedance, in order to find the eigenfrequencies of the circuit, $X=[\dot{V}_1, \dot{V}_2, \dot{V}_3, \dot{V}_4]^T$ may be defined where $V_i$ (i=1, 2, 3, 4) is the voltage induced on $C_i$. Assuming that $R_p$ is large enough to be ignored safely (which is often the case in deionized MUTs), the application of Kirchhoff's voltage law yields a system of linear equations (in the matrix form of AX+B=0) where:

$$A = \begin{bmatrix} L_1C_1 & M_{12}C_2 & 0 & 0 \\ M_{12}C_1 & L_2C_2 & M_{23}C_3 & 0 \\ 0 & M_{23}C_2 & L_3C_3 & M_{34}C_4 \\ 0 & 0 & M_{34}C_3 & L_4C_4 \end{bmatrix}, B = \begin{bmatrix} (R_1+R_g)C_1\dot{V}_1 + V_1 \\ R_2C_2\dot{V}_2 + V_2 \\ R_3C_3\dot{V}_3 + V_3 \\ R_4C_4\dot{V}_4 + V_4 \end{bmatrix} \quad (2)$$

The solution of this system of equations is represented in terms of $\dot{V}_i$ and $V_i$. Therefore, the state vector $\Psi=[V_1, V_2, V_3, V_4, \dot{V}_1, \dot{V}_2, \dot{V}_3, \dot{V}_4]^T$ may be defined where T denotes the transpose operator and forms the system matrix $\mathcal{L}_{8\times 8}$ represented in the Liouvillian formalism obeying the differential equation $$\frac{d}{dt}\Psi = \mathcal{L}\Psi,$$

as further described below. The eigenfrequencies of the circuit may be found by a direct diagonalization of $\mathcal{L}$ or any other calculational method.

Figure 6:
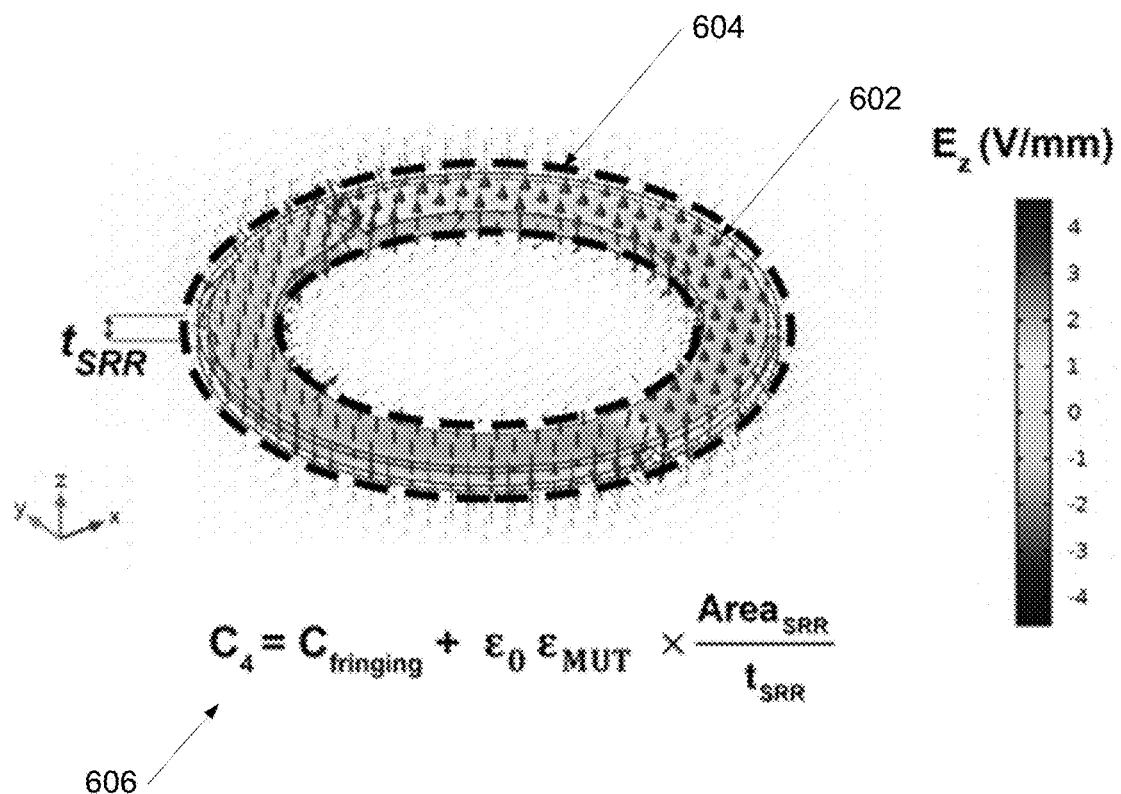
FIG. 6 illustrates a finite element method ("FEM") simulation of a sensor node at its eigenfrequency in accordance with an embodiment of the invention.

A finite element method ("FEM") simulation of a sensor node at its eigenfrequency in accordance with an embodiment of the invention is shown in FIG. 6. A FEM simulation 600 of the sensor node at its eigenfrequency is illustrated. In various embodiments, arrows 602 represent the electric field distribution at the SRR with hydrogel as the interlayer. The effective area of the SRR may be confined and marked by the dashed lines 604. The uniform electric fields passing through the interlayer may form a major sensitive part of the capacitance, and the fringing fields may create a small portion of the capacitance which may result in the slightly shifted resonance of the sensor. This additive part, however, may be negligible as it is constant throughout the experiments.

Figures 2A, 2B, 2C:
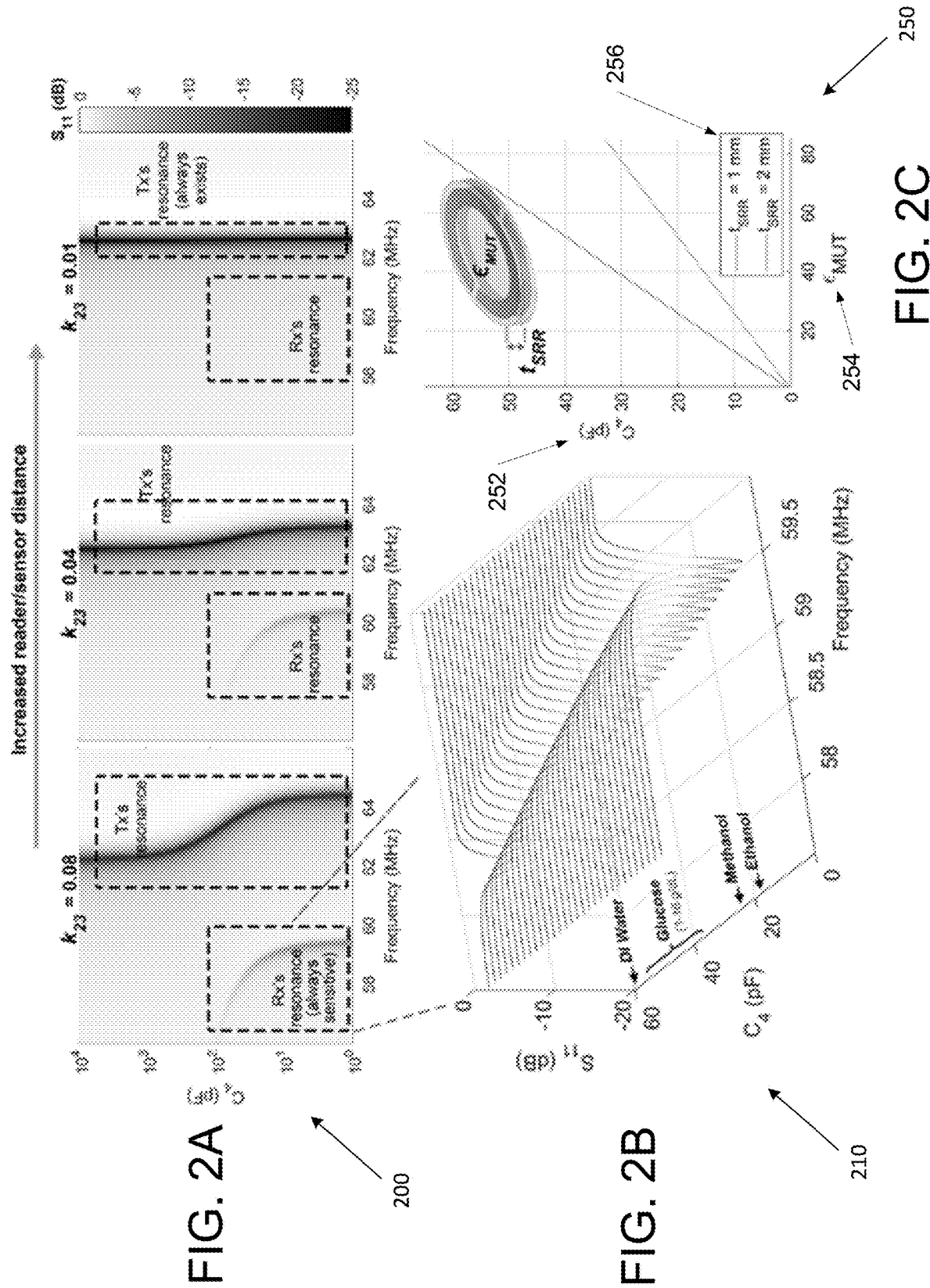
FIG. 2A are graphs illustrating frequency responses in accordance with an embodiment of the invention.
FIG. 2B is a graph illustrating Rx's eigenfrequency and sensitivity to the material-under-test ("MUT") permittivity in accordance with an embodiment of the invention.
FIG. 2C is graph illustrating $C_4$ as a function of the permittivity of the MUT (for chemical sensing) and thickness of the interlayer (for pressure sensing) in accordance with an embodiment of the invention.

In many embodiments, the sensor-SRR's equivalent capacitor may be formed by the uniform electric field inside the interlayer, and its inductance is approximated with a circular loop of the same size. In various embodiments, the SRR may be designed such that its equivalent capacitor $C_4$ 606 changes within 1 to 60 pF depending on the environment sampled by the MUT, and its baseline operation frequency may be readily tunable by modulating the interlayer thickness. A graph 250 illustrating $C_4$ 252 as a function of the permittivity of the MUT 254 (for chemical sensing) and thickness of the interlayer 256 (for pressure sensing) in accordance with an embodiment of the invention is shown in FIG. 2C.

In the conventional sensor readout, the peak of $|S_{11}|$ varies with the sensor's resonant frequency; however, its magnitude highly depends on the distance between the sensor and reader antenna. In fact, their direct mutual coupling (which in the scenario shown would be $k_{14}$) dramatically reduces with increasing the distance. Hence changes in sensor resonant response can only be seen in the reflection coefficient of the VNA at high $k_{14}$ coupling values, where $|S_{11}|$ is of a sufficient magnitude to be read by the VNA.

Figure 7:
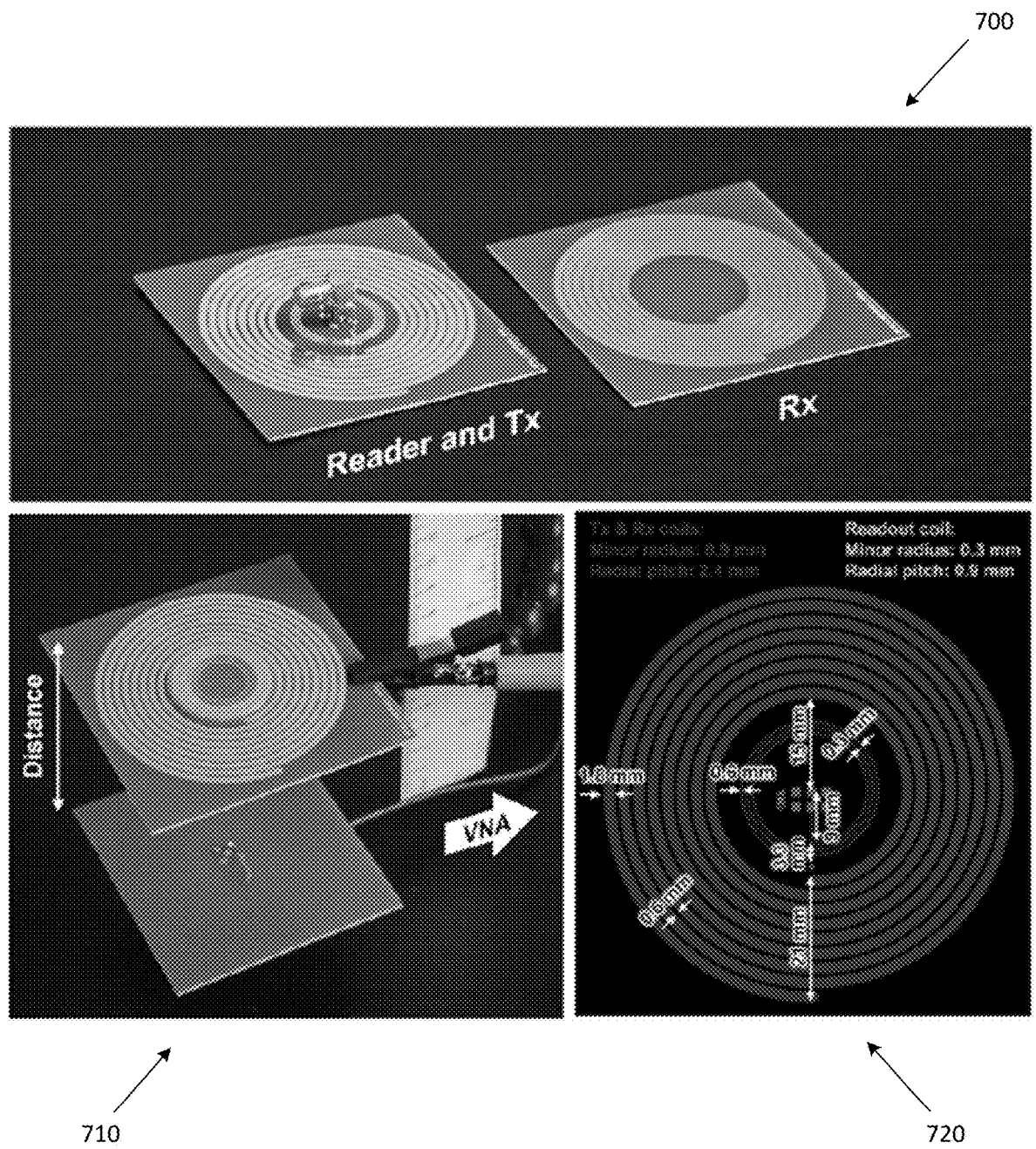
FIG. 7 illustrates an experimental setup and design parameters in accordance with an embodiment of the invention.

As illustrated in FIG. 1C, a 4-resonator system 130 with planar helical coils (Tx 134 and Rx 138) and an SRR sensor 136 may be utilized, whose electrical characteristics are represented in Table I, reproduced below. In many embodiments, both the Tx and Rx coils 134, 138 may be identical passive elements possessing the same or similar designs. Such design choices may lead to the same resonant characteristics and to exchange energy efficiently and excite low loss resonances. An experimental setup and design parameters, including geometric parameters, in accordance with an embodiment of the invention is shown in FIG. 7, as further described below.

TABLE I

Equivalent circuit elements of the coils.

| Parameter | Value | Parameter | Value |
|---|---|---|---|
| $R_1$ | 5Ω | $C_1$ | 8 pF |
| $R_2$, $R_3$ | 0.1Ω | $C_2$, $C_3$ | 1.8 pF |
| $R_4$ | 1Ω | $C_4$ | 1~60 pF |
| $R_g$ | 50Ω | $R_p$ | 5-10 kΩ |
| $L_1$ | 338 nH | $k_{12}$ | 0.21 |
| $L_2$, $L_3$ | 3.69 μH | $k_{23}$ | 0.001~0.1 |
| $L_4$ | 18.28 nH | $k_{34}$ | 0.54 |

Figure 1E:
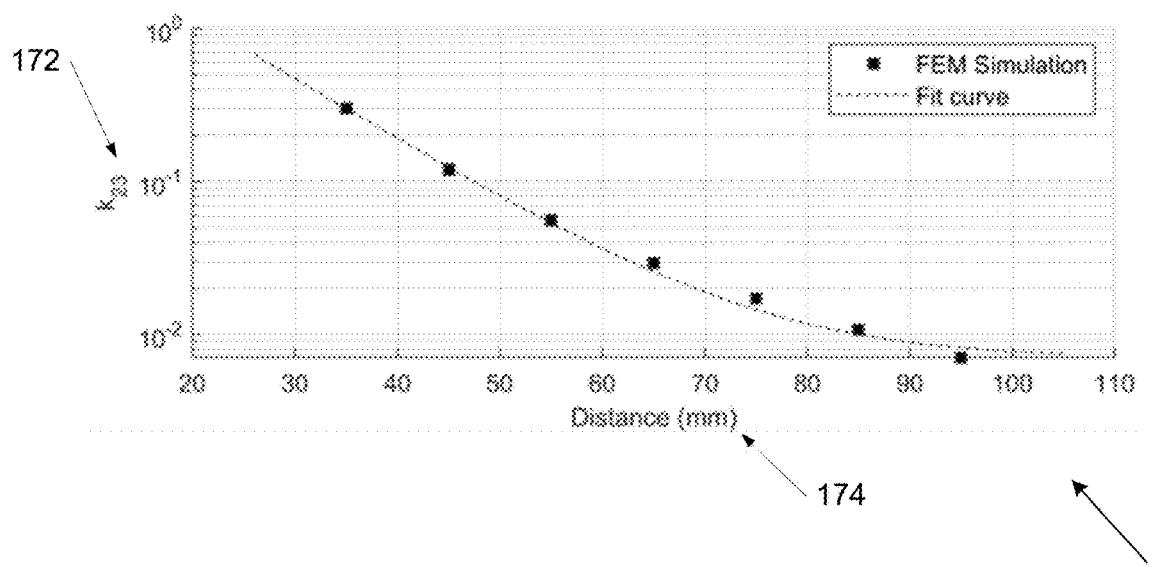
FIG. 1E is a graph illustrating coupling coefficient versus the distance between Tx/Rx in accordance with an embodiment of the invention.

A graph 170 illustrating coupling coefficient versus the distance between Tx/Rx in accordance with an embodiment of the invention is shown in FIG. 1E. In many embodiments, a finite element method (FEM) simulation may be used to calculate $k_{23}$ 172 at various distances 174 between the Tx and Rx coils. Because of the strong magnetic coupling, the eigenfrequencies of the system possess extremely small decay rates, and thus the resonant frequency of this coupled system may be detectable even at an extremely low coupling coefficient. This physical phenomenon is broadly similar to parity-time symmetric systems that induce extraordinary characteristics such as high sensitivity; however, there has been no use of active gains in systems in accordance with embodiments of the invention.

Figure 1F:
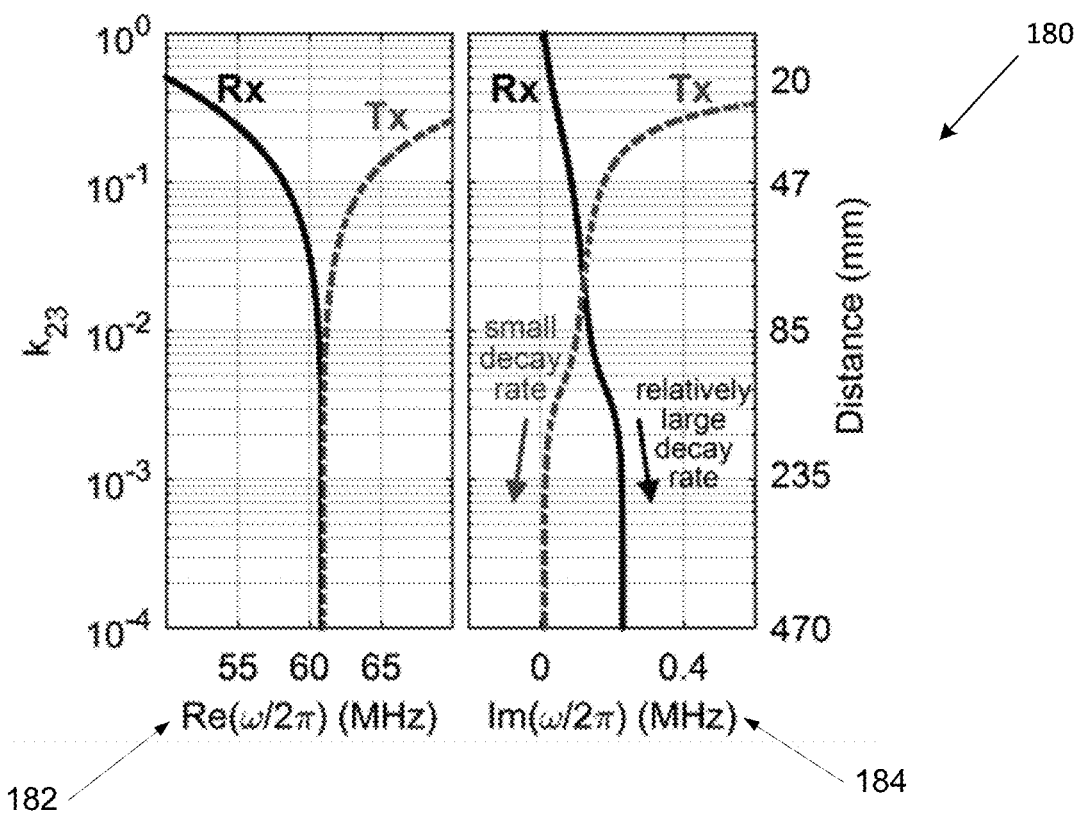
FIG. 1F is a graph illustrating the real and imaginary eigenfrequencies of a coupled-resonance readout system achieved in a magnetically coupled resonance system in accordance with an embodiment of the invention.
Figure 1G:
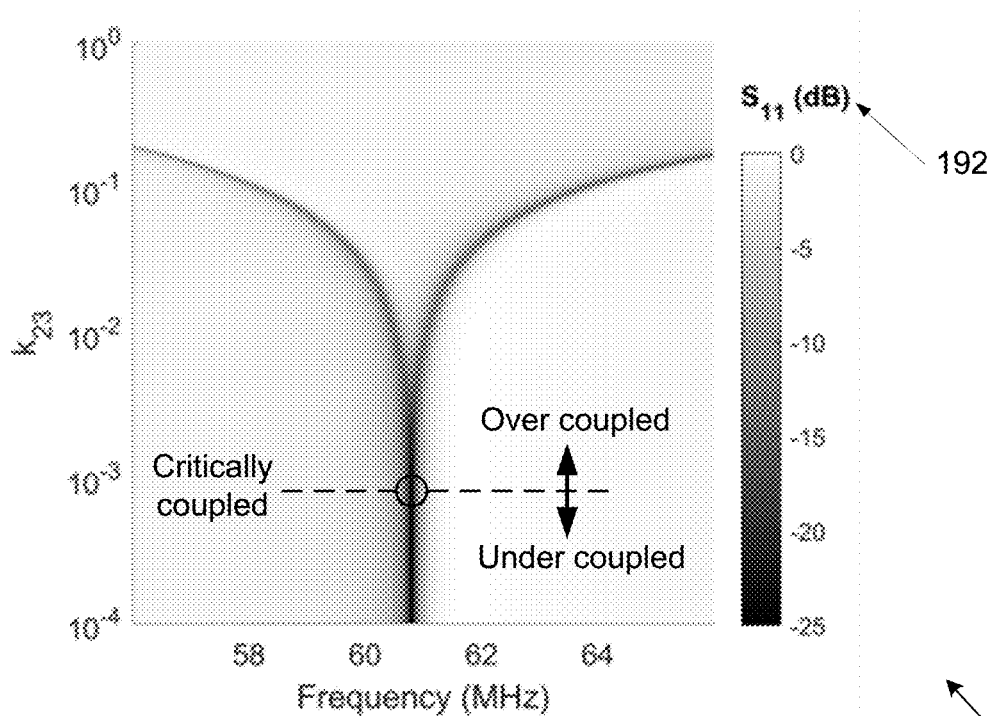
FIG. 1G is a graph illustrating a representation of eigenfrequencies in terms of a reflection coefficient achieved from an input impedance in accordance with an embodiment of the invention.

A graph 180 illustrating the real and imaginary eigenfrequencies 182, 184 of a coupled-resonance readout system achieved in a magnetically coupled resonance system in accordance with an embodiment of the invention is shown in FIG. 1F. A graph 190 illustrating a representation of eigenfrequencies in terms of a reflection coefficient achieved from an input impedance in accordance with an embodiment of the invention is shown in FIG. 1G. The frequency response of the complete sensing-circuit configuration may be represented in terms of $|S_{11}|$ 192 since it can be practically measured by VNA. At extremely small couplings (e.g., $k_{23}<0.01$) the VNA may pick up only the reader and Tx coils' natural resonances that are independent of the sensor (or $C_4$) perturbation due to the lack of inductive link. Within the strong coupled magnetic resonance condition, the eigenfrequency (that represented the Tx) may split into two resonant peaks (highlighted as over coupled zone in FIG. 1G) that correlate with the Rx and Tx coils. In other words, according to equation (1) above, the imaginary parts of the Tx/Rx eigenfrequencies, that relate to the radiation loss, may become near zero and independent from $k_{23}$.

In many embodiments, the inductive coupling between the Rx and sensor adds the sensor's impedance effect into the Rx loop. This maps the environmental conditions on to the spectral response of Rx. By decreasing the distance, Rx gradually starts coupling to the Tx—this increases $k_{23}$. As the coupling slightly enhances, this narrowband inductive link may form between the Tx and Rx. As a result of this significantly small decaying rate of the Tx and Rx coils (known as strongly coupled resonances), the Rx coil resonance may shift with the perturbation of sensing $C_4$ and may be utilized for sensing at large distances.

Graphs 200 illustrating frequency responses in accordance with an embodiment of the invention are shown in FIG. 2A. The frequency responses of the proposed system versus $C_4$ for various couplings $k_{23}$ are illustrated. In various embodiments, the Tx resonance may be picked up by the reader coil because of their proximity. A graph 210 illustrating Rx's eigenfrequency and sensitivity to the MUT permittivity in accordance with an embodiment of the invention is shown in FIG. 2B. Illustrated is the Rx's eigenfrequency and its sensitivity to the MUT permittivity for $k_{23}$=0.08 (equivalent to 50 mm distance).

Figure 8:
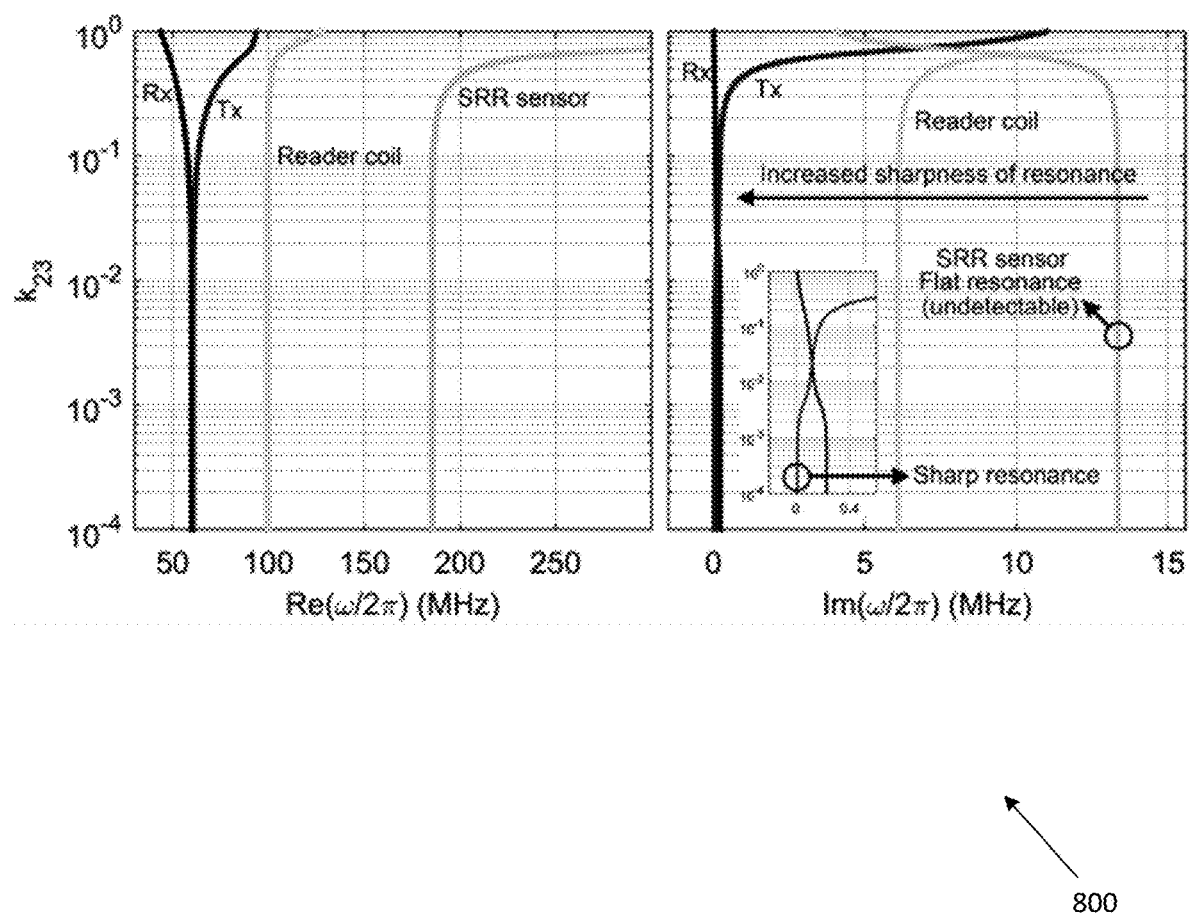
FIG. 8 are graphs illustrating wide spectrum demonstration of eigenfrequencies in accordance with an embodiment of the invention.

In various embodiments, the sensor-SRR may be designed such that its capacitance varies from 1 to 60 pF for different MUTs, that are sensitive to parameters such as, but not limited to, glucose, alcohol, and/or water. Graphs 800 illustrating wide spectrum demonstration of eigenfrequencies in accordance with an embodiment of the invention are shown in FIG. 8. In many embodiments, at smaller couplings (<0.01), the Rx resonance may lose sharpness. Further, the reader coil's imaginary eigenfrequency may not be affected by decreasing $k_{23}$ as due to the direct connection, as it may depend on the ohmic and radiative loss of the reader's coil.

In reference to FIG. 8, the wideband spectrum of the eigenfrequencies of all four nodes are depicted. There may be a limitation, however, in that the magnitude of the sensor-sensitive resonant peak reduces as $k_{23}$ weakens. Depending on the geometry and electrical properties of the system, this may mark the maximum operational range of the readout method (i.e., limited by the over coupled zone where the system resonances split).

Figure 9:
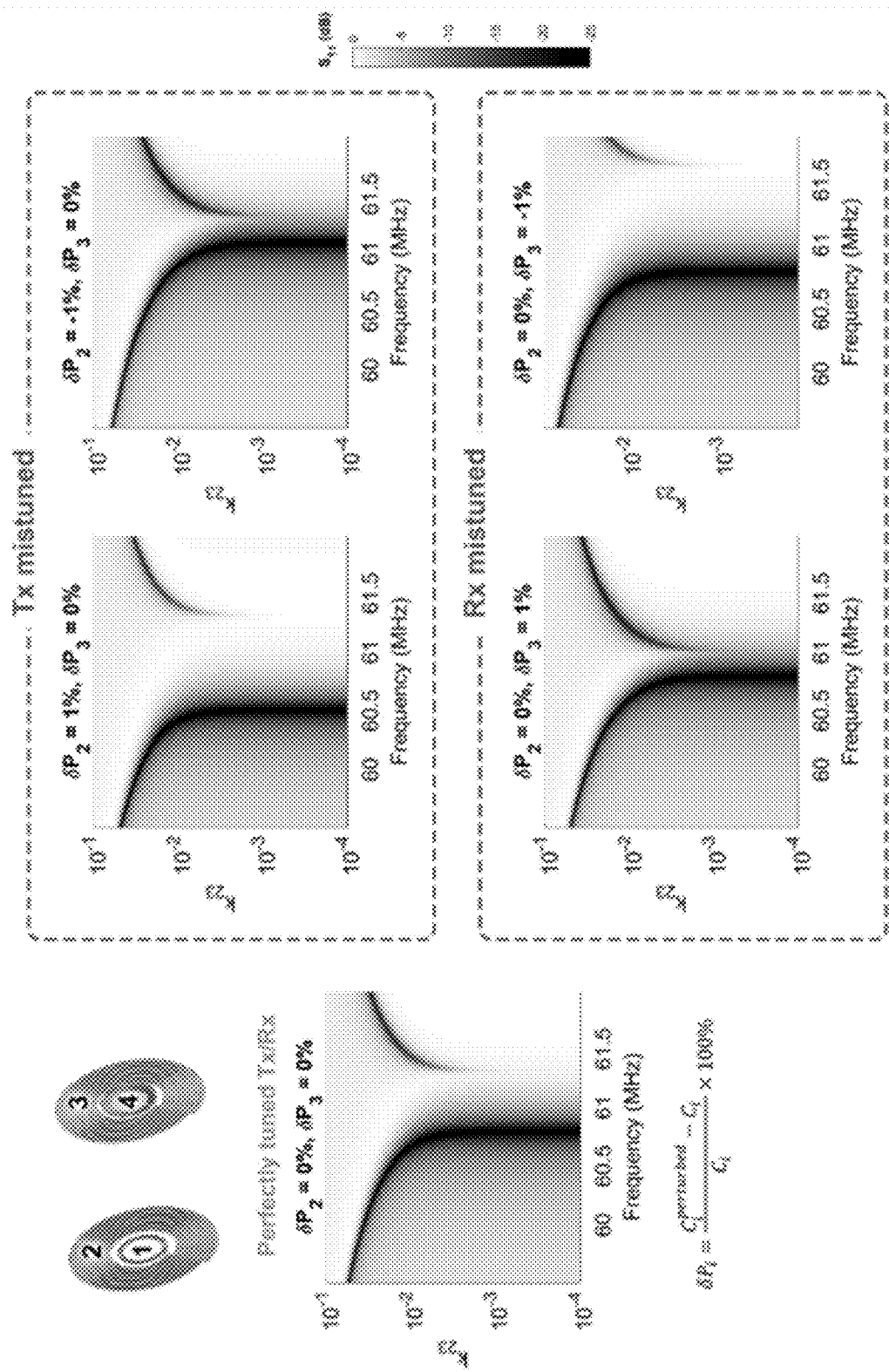
FIG. 9 are graphs illustrating resonances with a largest magnitude occurring when coils are perfectly re-tuned after coupling to the reader and sensor nodes in accordance with an embodiment of the invention.

The equivalent inductances (and thus the resonant frequencies of the Tx and Rx coils) slightly change after coupling to the reader and sensor nodes. To excite low loss resonances, the identical Tx and Rx coils should be re-tuned in the presence of the other nodes by perturbing the $2^{nd}$ and $3^{rd}$ parasitic capacitances indicated by $C_i^{perturbed}=(1+\delta P_i)C_i$ where the $i^{th}$ node perturbation is represented by $\delta P_i$. Such perturbations can be used for better tuning to maximize the reflection coefficient's magnitude. Graphs 900 illustrating resonances with a largest magnitude occurring when coils are perfectly re-tuned after coupling to the reader and sensor nodes in accordance with an embodiment of the invention are shown in FIG. 9. As illustrated, resonances with the largest magnitude may happen when the coils are perfectly re-tuned after coupling to the reader and sensor nodes. This tuning may be practically easy and consistent because of the passive nature of all elements. Once tuned, the system may not require any modification during the sensing operation.

The sensitivity of the coupled resonance readout system is compared to that of the conventional readout for different orders of the coupling coefficient in FIGS. 10A-D. Specifically, a diagram 1000 illustrating frequency splitting in accordance with an embodiment of the invention is shown in FIG. 10A. FIG. 10A illustrates the frequency splitting at the tuned coils for $C_4$=30 pF. Further, a diagram 1010 illustrating sensitivity at different coupling coefficients in accordance with an embodiment of the invention is shown in FIG. 10B. Moreover, a diagram 1020 illustrating frequency splitting for a conventional readout in accordance with an embodiment of the invention is shown in FIG. 10C. Furthermore, a diagram 1030 illustrating sensitivity at different coupling coefficients for a conventional readout in accordance with an embodiment of the invention is shown in FIG. 10D. At relatively larger couplings, the Tx coil resonance becomes sensitive to $C_4$ perturbation; however, it may not be utilized for sensing as its sensitivity may depend highly on the distance. Although the Rx coil resonant shifts with distance, its sensitivity profile may remain unchanged. With the strong coupling, the coupling coefficient may be at least an order of magnitude smaller, resulting in a higher order of readout distance.

Although specific systems for wireless sensor networks with augmented telemetry using coupled magnetic resonances are discussed above with respect to FIGS. 1A-2C and 5-10D, any of a variety of systems including a variety of readers, Tx coils, sensors, Rx coils, biosensors, analysis, and using various communication protocols as appropriate to the requirements of a specific application can be utilized in accordance with embodiments of the invention. Validation of magnetically coupled resonance systems in accordance with embodiments of the invention is discussed further below.

Validation

An experimental setup 700 and design parameters 710, including geometric parameters 720, in accordance with an embodiment of the invention is shown in FIG. 7. In many embodiments, to demonstrate the feasibility of the proposed scheme and its comparison to the conventional readout with the same reader and sensor, the system may be fabricated on printed circuit boards (PCBs). This may ensure that the coils are fabricated precisely.

Figure 3A:
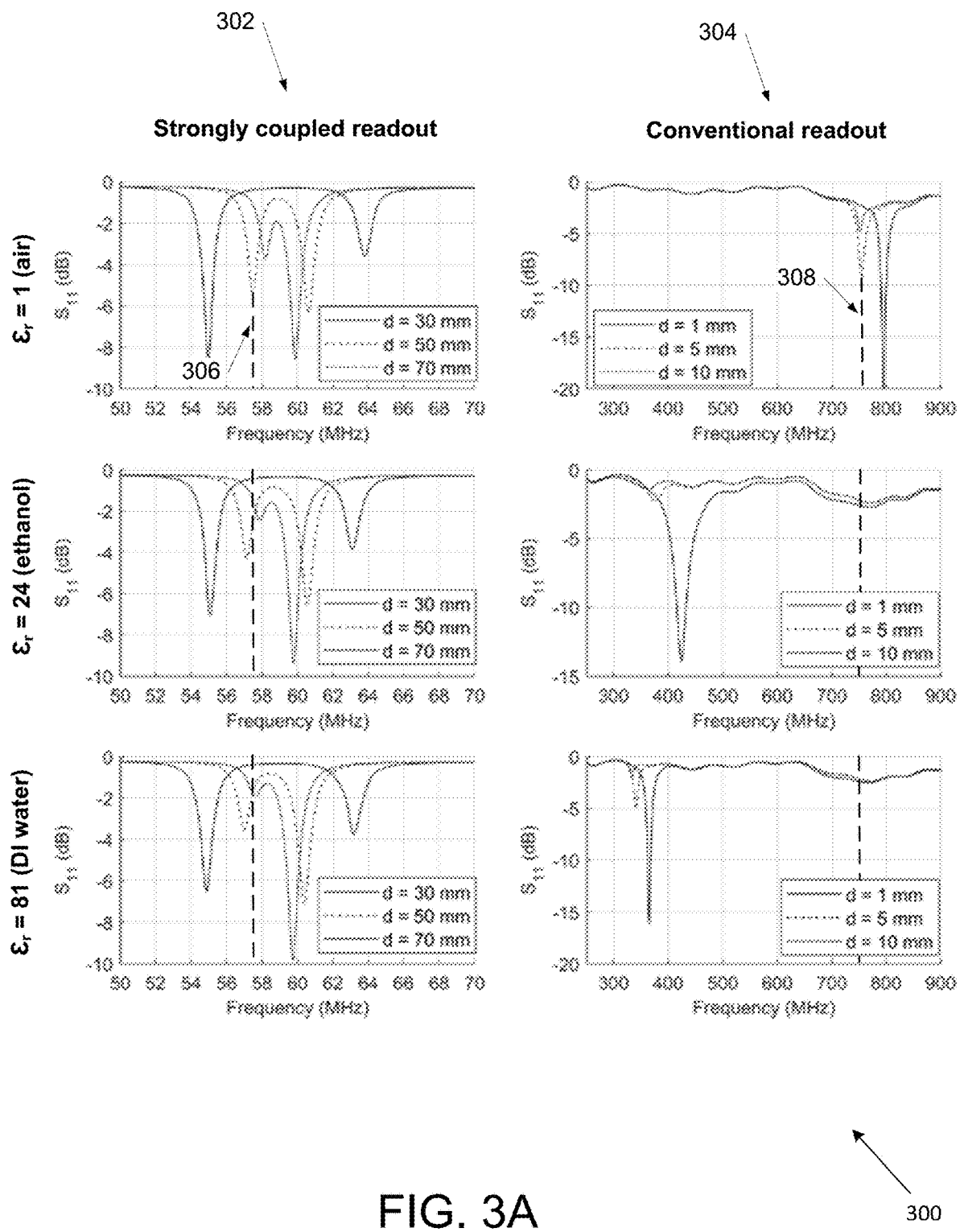
FIG. 3A are graphs illustrating a comparison between the strong magnetic coupling enabled (including Tx and Rx coils) and conventional readout systems in accordance with an embodiment of the invention.

Graphs 300 illustrating a comparison between the strong magnetic coupling enabled 302 (including Tx and Rx coils) and conventional readout 304 systems in accordance with an embodiment of the invention are shown in FIG. 3A. The comparison is made using the same readout and sensors for the strong magnetic coupling enabled 302 and the conventional readout 304 systems at various distances between the Tx and Rx (noted by d). The unperturbed resonance 306, 308 at select distances is highlighted by the dashed line.

In various embodiments, a sensor-SRR with various interlayer materials may be used to test the readout system's functionality at larger distances in accordance with embodiments of the invention. However, its operation is not limited to specific SRRs. Generally, any LRC resonator whose inductor may be coupled to the Rx coil may be utilized as the sensor node. For Rx/Tx design, a readout range of 70 mm may be achieved, which is roughly 10-fold greater than that without the presence of the coupled resonant coils.

Figure 3B:
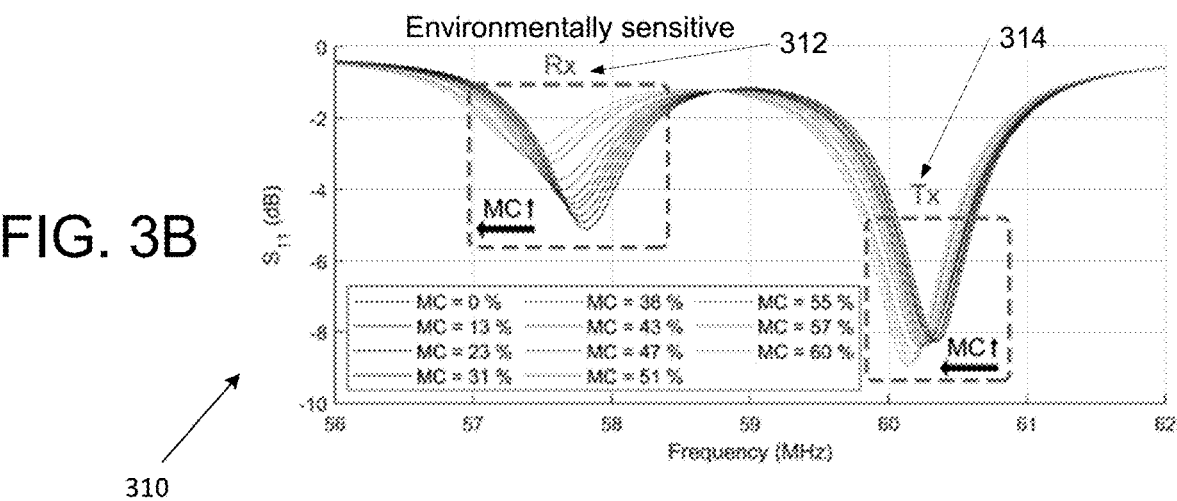
FIG. 3B is a graph illustrating sensitivity to the water moisture content in accordance with an embodiment of the invention.

A graph 310 illustrating sensitivity to the water moisture content in accordance with an embodiment of the invention is shown in FIG. 3B. The sensitivity to the water moisture content at a 60 mm distance is illustrated. A thin layer of cellulose with a mass of 0.2 g may be used as the SRR's interlayer. As a further example of the sensitivity test, the same SRR with a porous cellulose interlayer may be used to measure the water moisture content at the sensor node. It is observed that the resonant frequency corresponding to the Rx coil reflects the changes in the relative permittivity of the interlayer. The graph 310 also highlights the Rx coil's resonance 312 and the Tx coil's resonance 314.

Figure 3C:
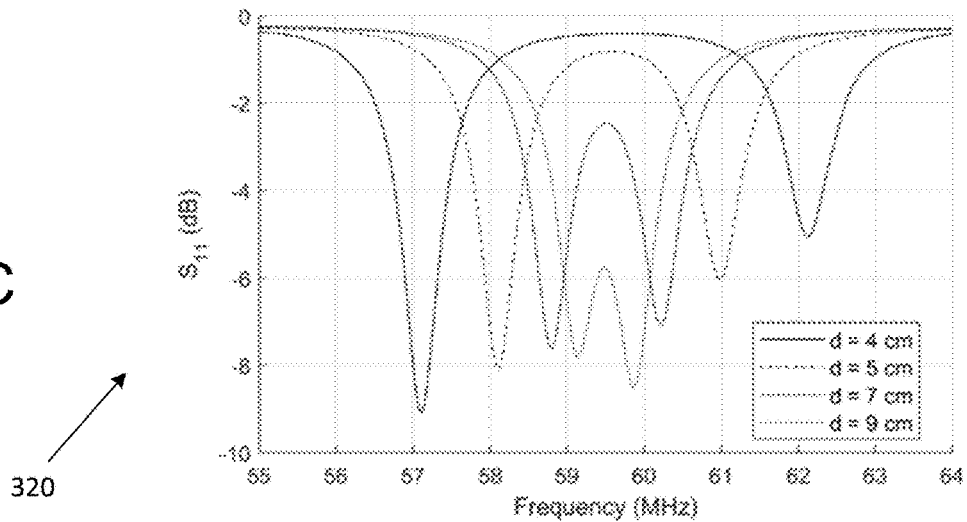
FIG. 3C is graph illustrating frequency splitting gap within an over coupled regime in accordance with an embodiment of the invention.

As illustrated in FIG. 1G, and described further above, the frequency gap between the two eigenfrequencies may relate to the distance between the reader and sensor nodes. In addition to utilization for canceling the resonance shift resulted by various distances, this may be used to simultaneously monitor sensor distance (with applications such as, but not limited to, measurement of breathing rate) as well as sensor environmental state via the readout coil. A graph 320 illustrating frequency splitting gap within an over coupled regime in accordance with an embodiment of the invention is shown in FIG. 3C. Exhibiting two eigenfrequencies may add a distinct advantage against traditional readout schemes (with only one resonance), which are unable to decouple the sensor distance from its environmental response. This enables the measurement of resistive sensors as capacitive ones in which it is difficult to decouple the sensor response from the distance effect since they both affect the response similarly (and thus resulting in the limited utility of sensors traditionally).

Figure 3D:
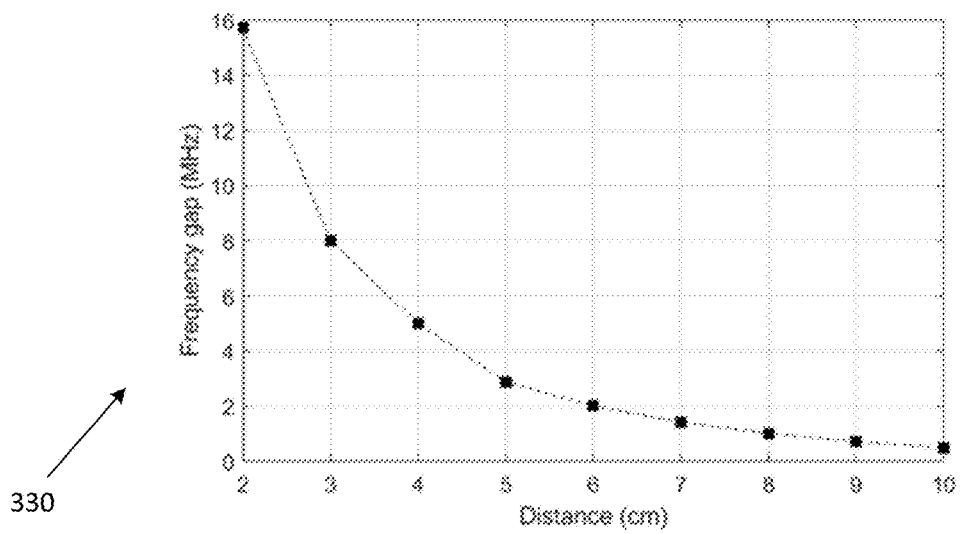
FIG. 3D is graph illustrating variation versus distance in accordance with an embodiment of the invention.

A graph 330 illustrating variation versus distance in accordance with an embodiment of the invention is shown in FIG. 3D. In several embodiments, a frequency splitting gap versus the distance is determined and utilized to detect the distance. It is observed that the sensitivity does not change at the measured distances.

A sensitivity comparison between a theoretical model, FED simulation, and a circuit analysis in accordance with an embodiment of the invention are shown in FIGS. 11A-C. In FIG. 11A, a sensitivity comparison 1100 between the theoretical model is illustrated. In FIG. 11B, a FEM simulation 1110 conducted in Comsol Multiphysics is illustrated. In FIG. 11C, a circuit analysis 1120 performed in Advanced Design System for $k_{23}$=0.08 (equivalent to a 50 mm distance) is illustrated. Using the coupled resonance readout system, although the amount of frequency shift is smaller than that in the conventional readout, it is yet detectable even with commercially available inexpensive miniature VNAs. This also is beneficial particularly in miniature sensors since wideband measurement equipment is not required.

Figure 12:
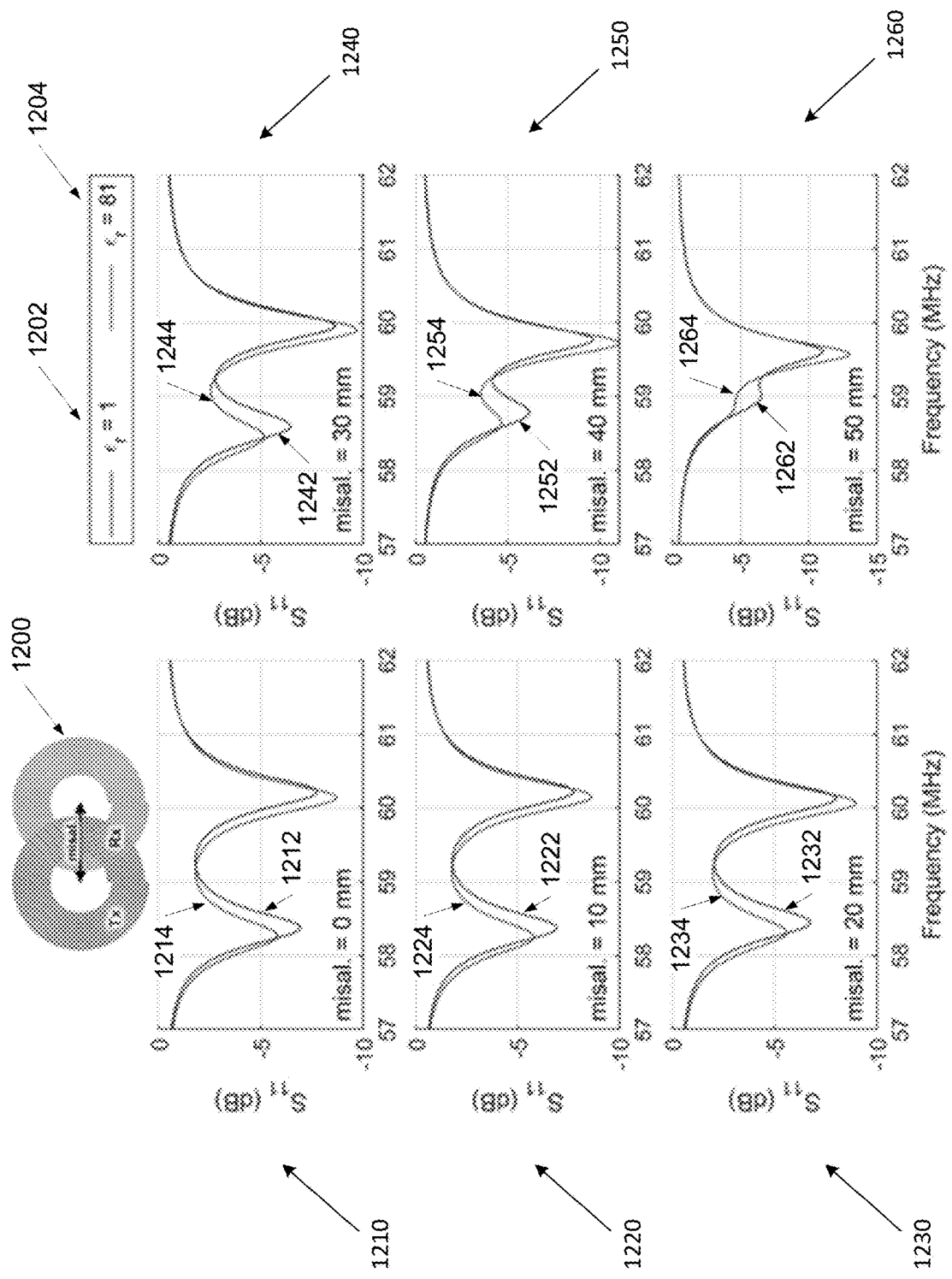
FIG. 12 illustrates the effect of misalignment between a Tx coil and a Rx coil and for various relative permittivities of an MUT in accordance with an embodiment of the invention.

The effect of misalignment between a Tx coil and a Rx coil 1200 and for various relative permittivities of an MUT in accordance with an embodiment of the invention is shown in FIG. 12. Illustrated is the effect of misalignment at a distance of 70 mm between the Tx and Rx coils and for various relative permittivities of the MUT (i.e., $\epsilon_r$=1 1202, $\epsilon_r$=81 1204). For example, an $\epsilon_r$=1 may correspond to air, an $\epsilon_r$=24 may correspond to ethanol, an $\epsilon_r$=81 may correspond to DI water, etc. In many embodiments, at 70 mm distance, the readout system may show a slight response to 20 mm misalignment, because at large distances (in which the readout is designed to operate), the misalignment leaves a minor effect on the already small coupling coefficient $k_{23}$. The graph 1210 illustrates the effect of a misalignment=0 mm at MUT permittivities $\epsilon_r$=1 1212 and $\epsilon_r$=81 1214. The graph 1220 illustrates the effect of a misalignment=10 mm at MUT permittivities $\epsilon_r$=1 1222 and $\epsilon_r$=81 1224. The graph 1230 illustrates the effect of a misalignment=20 mm at MUT permittivities $\epsilon_r$=1 1232 and $\epsilon_r$=81 1234. The graph 1240 illustrates the effect of a misalignment=30 mm at MUT permittivities $\epsilon_r$=1 1242 and $\epsilon_r$=81 1244. The graph 1250 illustrates the effect of a misalignment=40 mm at MUT permittivities $\epsilon_r$=1 1252 and $\epsilon_r$=81 1254. The graph 1260 illustrates the effect of a misalignment=50 mm at MUT permittivities $\epsilon_r$=1 1262 and $\epsilon_r$=81 1264.

Figures 4A, 4B, 4C:
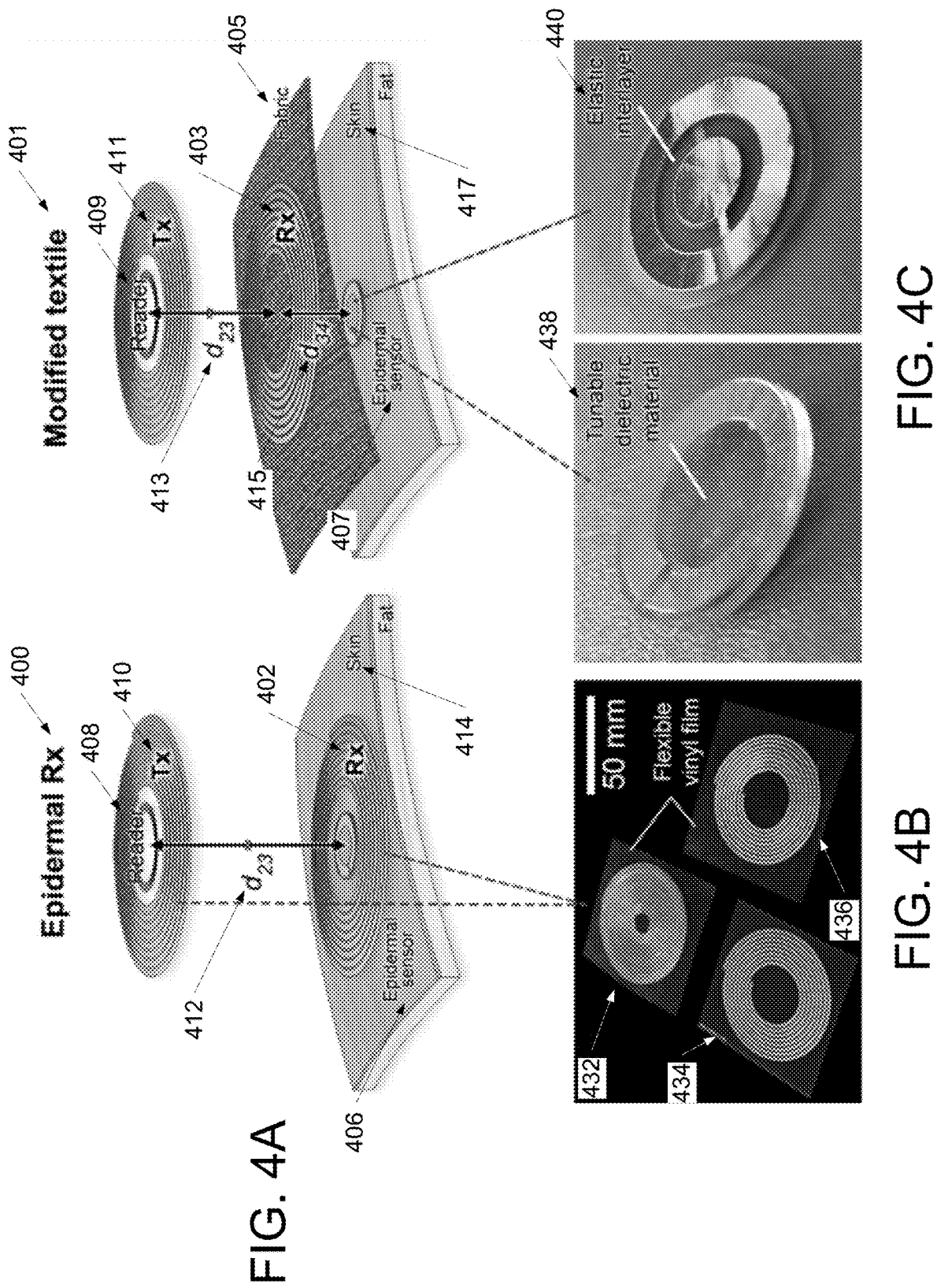
FIG. 4A is a system diagram of an epidermal sensors in a magnetically coupled systems in accordance with an embodiment of the invention.
FIG. 4B illustrates various implementations for Tx/Rx coils in accordance with an embodiment of the invention.
FIG. 4C illustrates various SRR implementations to respond to environmental stimuli including pressure in accordance with an embodiment of the invention.

A system diagrams of epidermal sensors in a magnetically coupled system and in a modified textile magnetically coupled system in accordance with an embodiment of the invention is shown in FIG. 4A. In many embodiments, the Rx 402, 403 may be placed on the outer or inner surface of the clothes 405 to pick up the resonance of the epidermal sensor 406, 407, which generally incorporates engineered dielectric material sensitive to the desired stimulus. Further, embodiments of the invention may significantly ease the telemetry for battery-free wireless epidermal sensors 406, 407 (such as, but not limited to, sweat sensors) where the Rx coil 402, 403 may be placed on the inner/outer surface of the clothes 405. As further described above, the system 400 may include a reader 408 coupled to a Tx coil 410 where the Tx coil 410 and the Rx coil 402 has a distance $d_{23}$ 412. Further, the system 401 may also include a reader 409 coupled to a Tx coil 411 where the Tx coil 411 and the Rx coil 403 has a distance $d_{23}$ 413. Moreover, the Rx coil 403 may also have a distance $d_{34}$ 415 to the epidermal sensor 407. In both systems 400, 401, the epidermal sensors 406, 407 may be placed on the skin 414, 417, respectively. In addition, magnetically coupled resonator systems may have considerable potential in implanted sensors. For example, in shallowly implanted subdermal sensors (e.g., <1-2 cm underneath the skin) the Rx may appear as an epidermal layer or planar coil stitched on clothes. In such embodiments, the body may serve as a substrate with high permittivity and add parasitic capacitance to Rx which needs Tx re-tuned. This, however, may slightly impacts the conventional inductive coupling between the Rx and sensor.

Figure 13A:
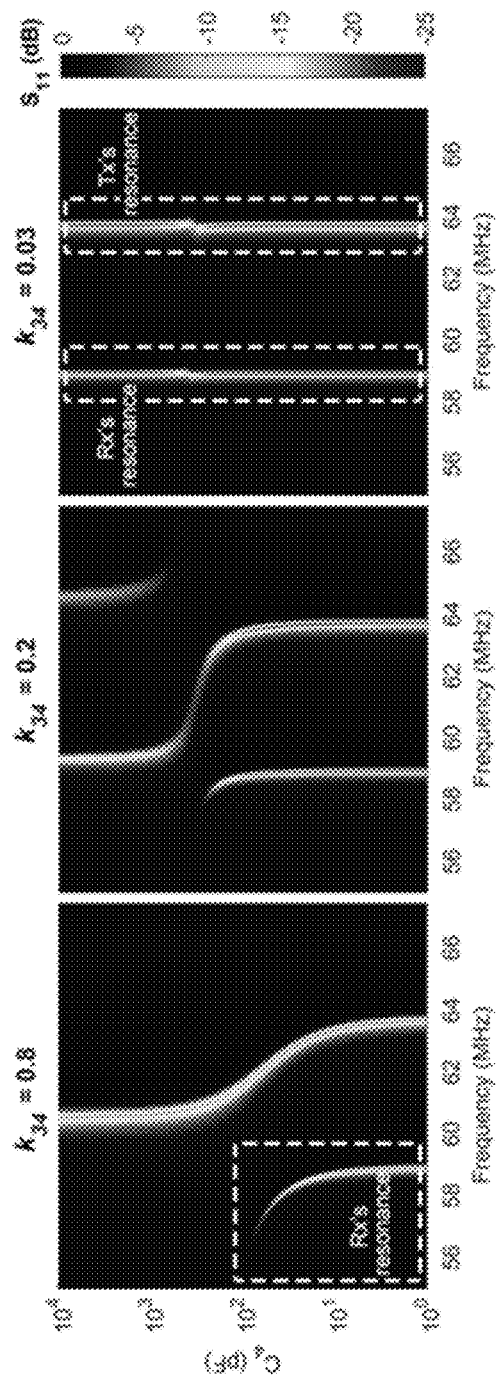
FIGS. 13A-B illustrate the effect of distanced sensor from the Rx coil in accordance with an embodiment of the invention.
Figure 13B:
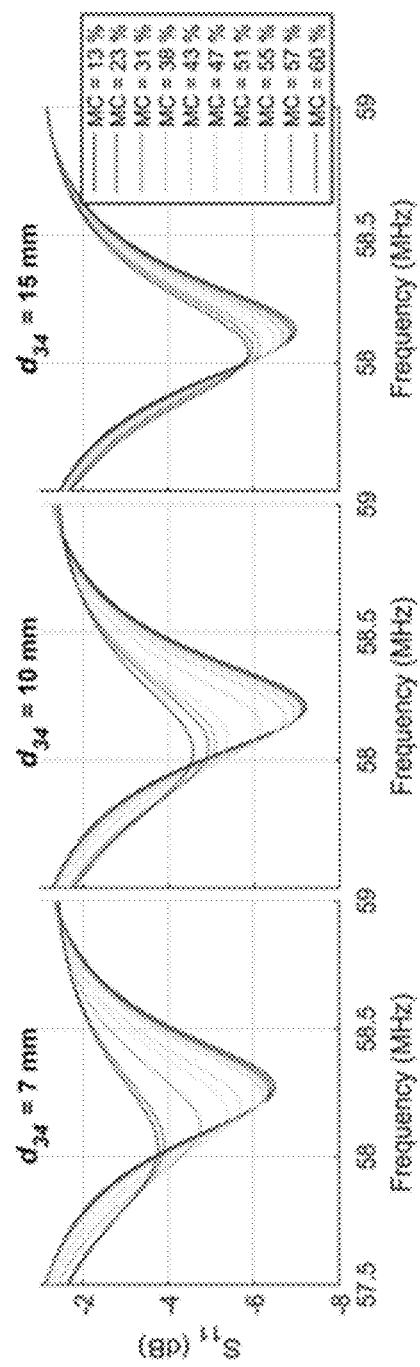

The effect of distanced sensor from the Rx coil in accordance with an embodiment of the invention is shown in FIGS. 13A-B. In FIG. 13A, the reflection coefficient at the distance of 50 mm between the Tx and Rx for various $k_{34}$ values found by the circuit theory is illustrated. In FIG. 13B, the sensitivity to the deionized water moisture content ("MC") in cellulose interlayer at a distance ($d_{23}$) of 50 mm for various $d_{34}$ values obtained by in-vivo experiment is illustrated. A possible solution to compensate for the weak $k_{34}$ may be to utilize an LRC resonator with a multi-turn inductor instead of the SRR-sensor to improve the inductive link. In sensors implanted deeper (>3-4 cm beneath the skin) the Tx may appear as the epidermal/tattoo-like coil while the miniaturized Rx/sensor nodes may be integrated and/or implanted.

Magnetically coupled resonance systems may be built on to the body and/or living systems in unique ways to extend the functionality of traditional RF sensors, as further described below. Various implementations for Tx/Rx coils in accordance with an embodiment of the invention is shown in FIG. 4B. Illustrated are some possible embodiments for Tx/Rx coils. The top embodiment 432 may be fabricated on a flexible vinyl film and resonates at the nearfield communication ("NFC") range (13.5 MHz) when placed on the clothes (approximately 5-10 mm distanced from the skin). The other embodiments (rigid on left 434 and flexible on right 436) may resonate at the VHF band (approximately 58 MHz).

Figure 4D:
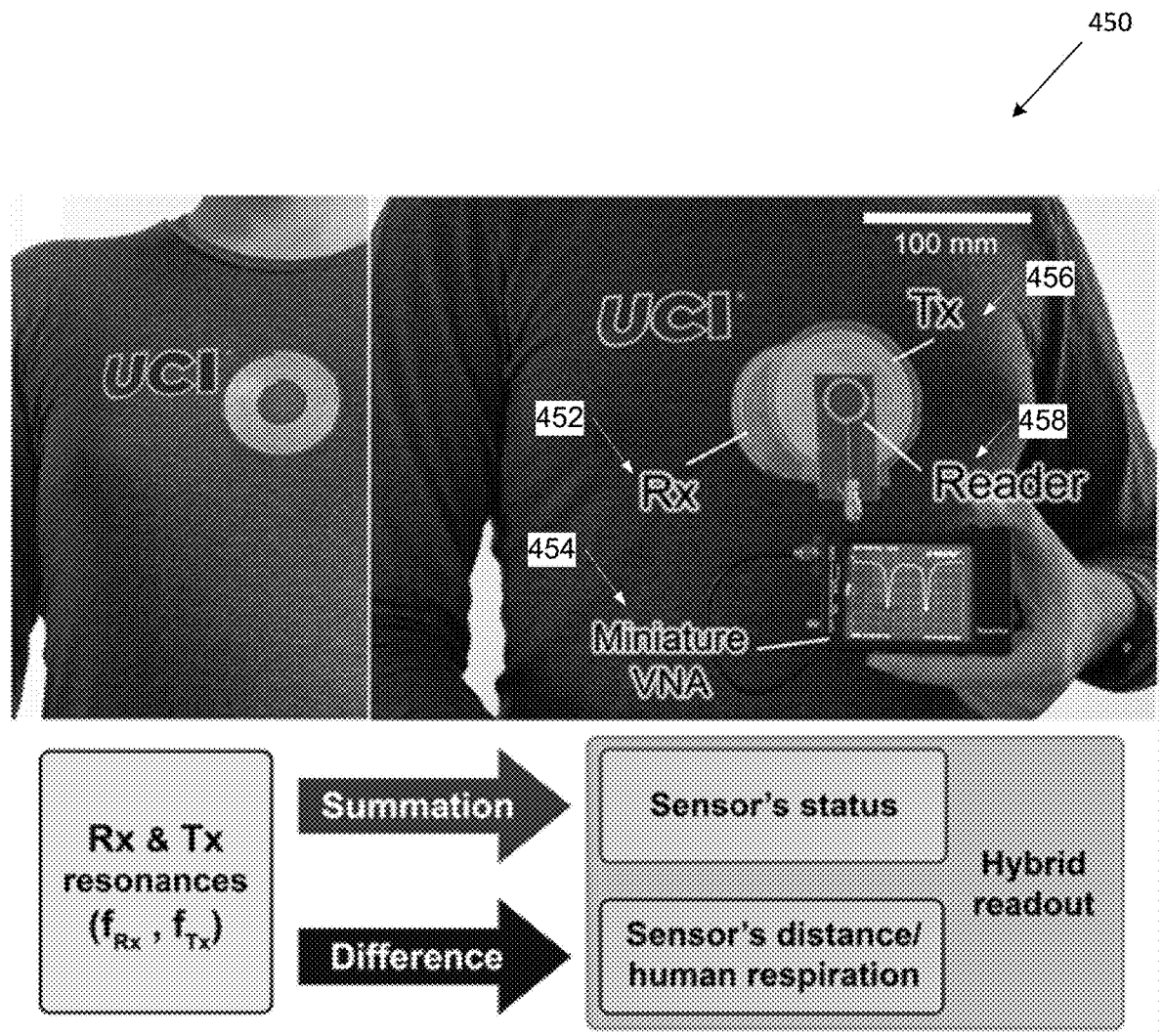
FIG. 4D illustrates on-body in-vivo demonstration of the Rx coil next to the epidermal sensor-SRR in accordance with an embodiment of the invention.

Various SRR implementations to respond to environmental stimuli including pressure in accordance with an embodiment of the invention is shown in FIG. 4C. On-body in-vivo demonstration 450 of the Rx coil next to the epidermal sensor-SRR in accordance with an embodiment of the invention is shown in FIG. 4D. Illustrated is the on-body in-vivo demonstration of the Rx coil 452 next to the epidermal sensor-SRR and the Tx coil 456 and the reader 458. Integration of the coupled resonances with miniature handheld VNAs 454 and/or NFC-enabled mobile devices (distanced about 70 mm from the body) may augment the long-range passive telemetry, particularly within daily routines. As a functional implementation of this technique, an SRR with 1 mm thick elastic interlayer 440 as a pressure sensor fixed on the human body may be utilized, as illustrated in FIG. 4C, and a modified cotton shirt with a patterned, conductive patch of a flexible Rx coil, as illustrated in FIG. 4D, distanced about 5 mm from the skin. In some embodiments, the SRR may also include a tunable dielectric material 438, as illustrated in FIG. 4C, and as further described above.

Figure 4E:
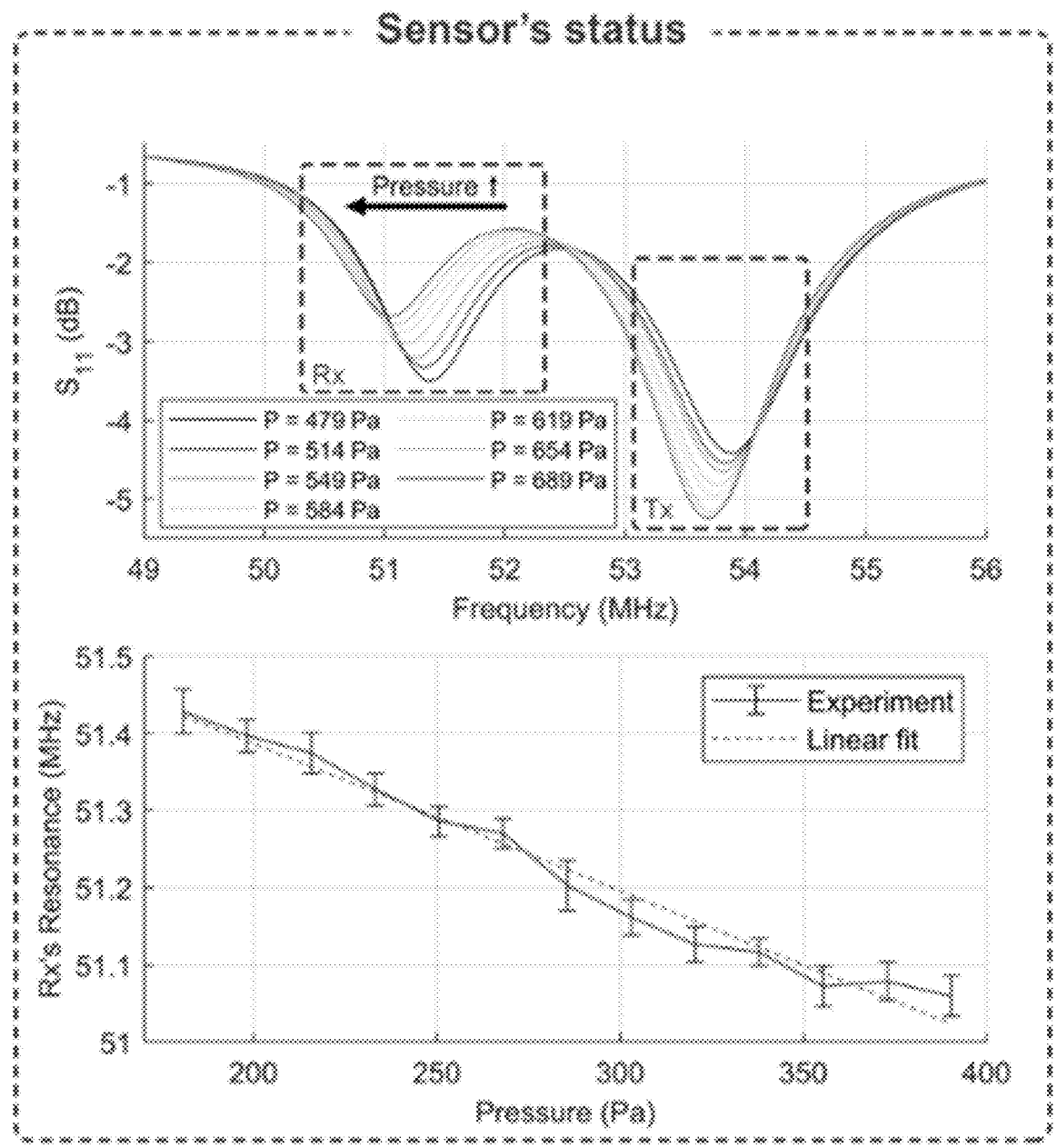
FIG. 4E is a graph illustrating measured reflection coefficient and Rx's resonance frequency shift versus pressure in accordance with an embodiment of the invention.

A graph 460 illustrating measured reflection coefficient and Rx's resonance frequency shift versus pressure in accordance with an embodiment of the invention is shown in FIG. 4E. Illustrated is the measured reflection coefficient and Rx's resonance frequency shift versus pressure (repeated 3 times), obtained by the in-vivo setup with a 55 mm distance between the Tx and Rx coils. In many embodiments, a reflection coefficient may be monitored using a miniature VNA through the Tx coil while applying incremental pressure.

Additionally, a co-readout of the distance between the same Tx and Rx coils to retrieve the human respiration in real-time may be utilized. During the inhalation, with a decrease in the distance $d_{23}$, the coupling coefficient $k_{23}$, and thus the frequency gap, may increase. In several embodiments, the weighted summation of the Rx and Tx resonances may relate to the sensor's status (i.e., pressure) since they may shift in the same direction with the change in the environmental stimuli. On the other hand, their difference may indicate the distance between the reader and sensor and may be used for respiration and movement detection.

Figure 4F:
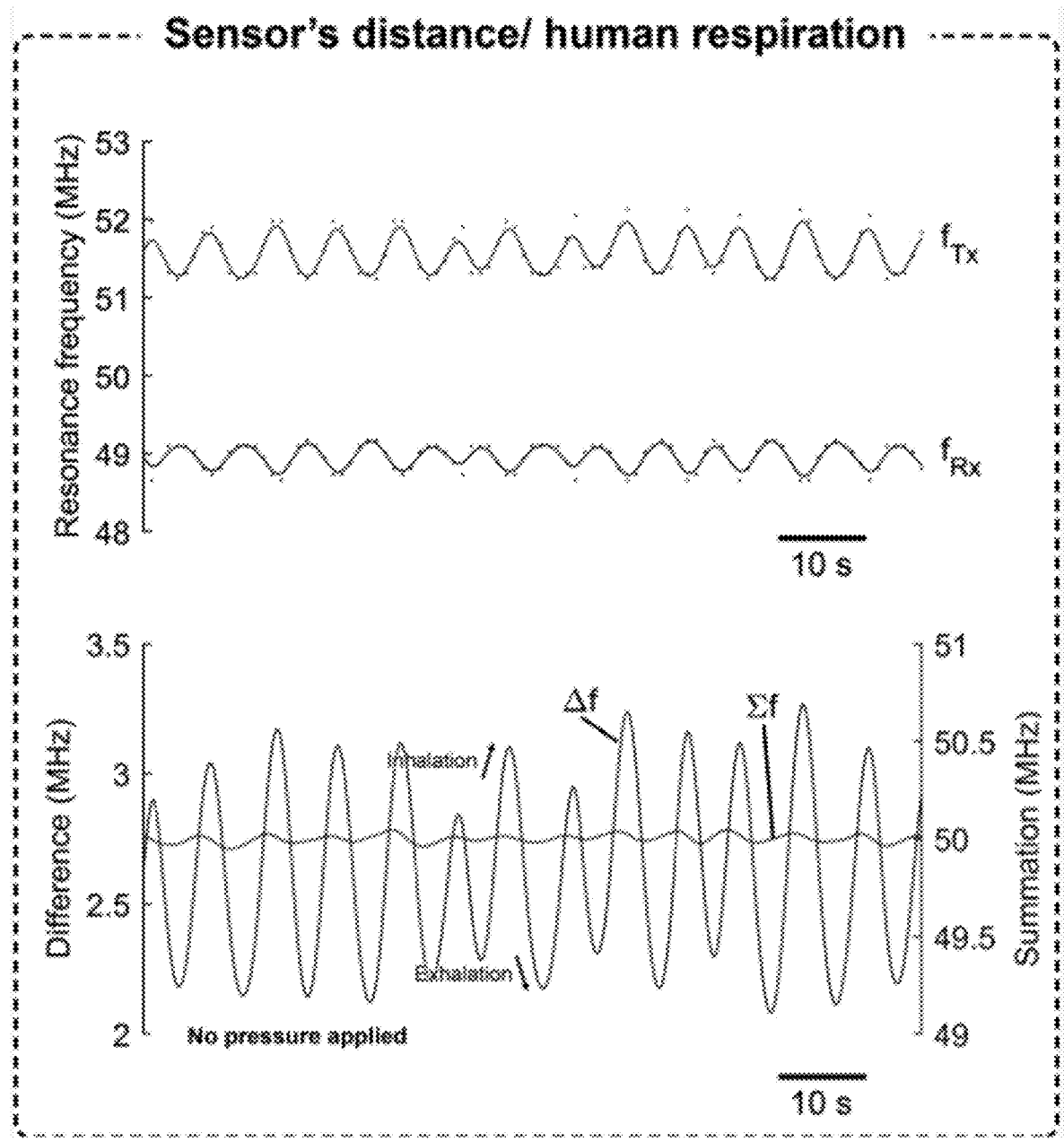
FIG. 4F is a graph illustrating a resting human respirational signal retrieved from the recorded Rx and Tx resonances in accordance with an embodiment of the invention.

A graph 470 illustrating a resting human respirational signal retrieved from the recorded Rx and Tx resonances in accordance with an embodiment of the invention is shown in FIG. 4F. Illustrated is the resting human respirational signal retrieved from the recorded Rx and Tx resonances (with a $d_{23}$ of about 60 mm at full exhalation). With no environmental stimulus, the weighted summation of resonant frequencies possesses a steady trend regardless of the respiration. A steady linear profile of the weighted summation and the movement-sensitive difference is illustrated in FIG. 4F. In various embodiments, this may be employed to align and normalize various sets of data measured at different distances and setups, as further described below.

Figure 4G:
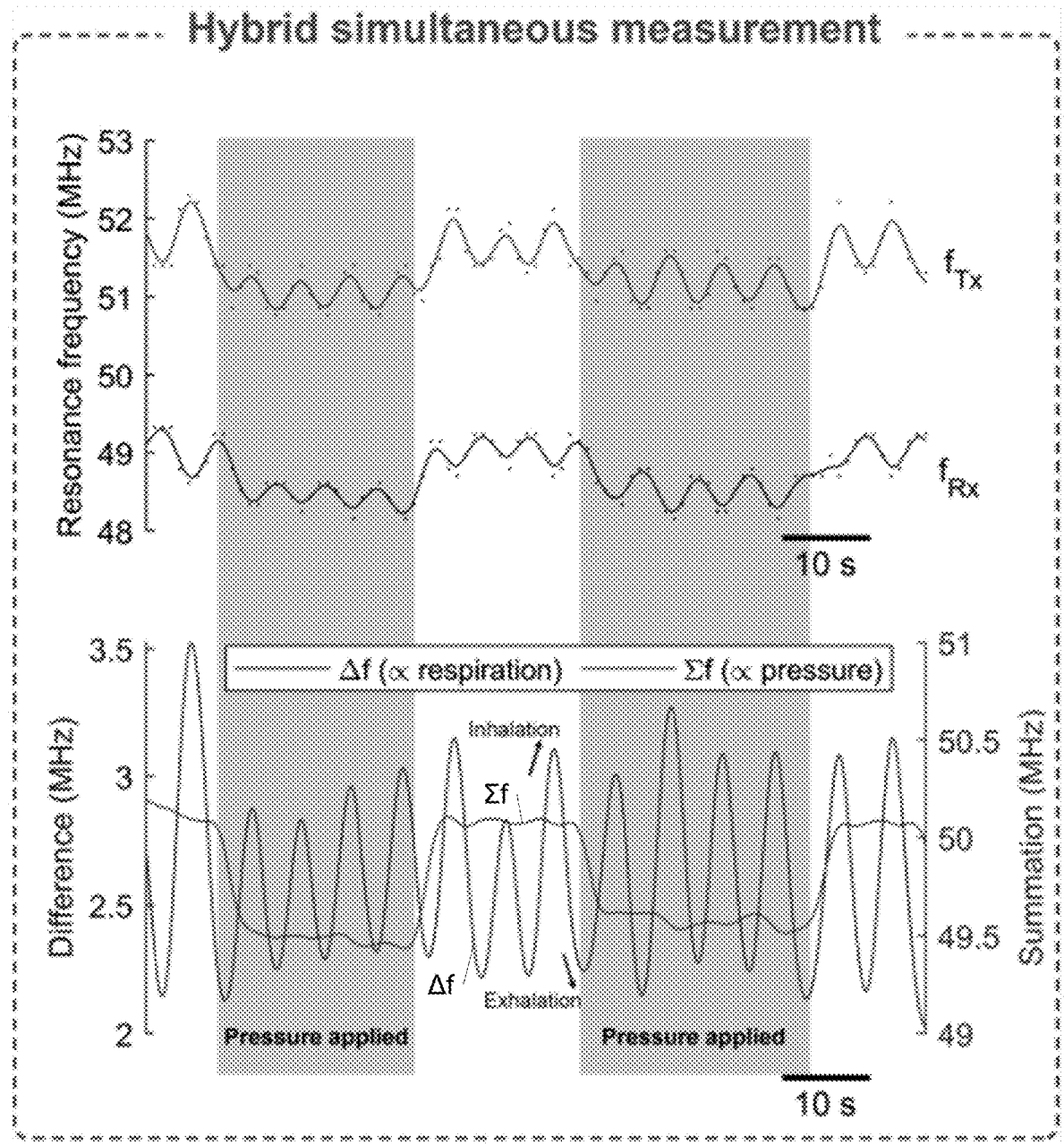
FIG. 4G is a graph illustrating simultaneous measurement of externally applied time-variant pressure and human respiration with a single readout in accordance with an embodiment of the invention.

In addition, a graph 480 illustrating simultaneous measurement of externally applied time-variant pressure and human respiration with a single readout in accordance with an embodiment of the invention is shown in FIG. 4G. Illustrated is the simultaneous measurement of externally applied time-variant pressure and human respiration with a single readout for 1.5 min at 60 mm distance between the Rx and Tx. The weighted summation and difference of frequencies may relate to the pressure and respiration, respectively.

Figure 14:
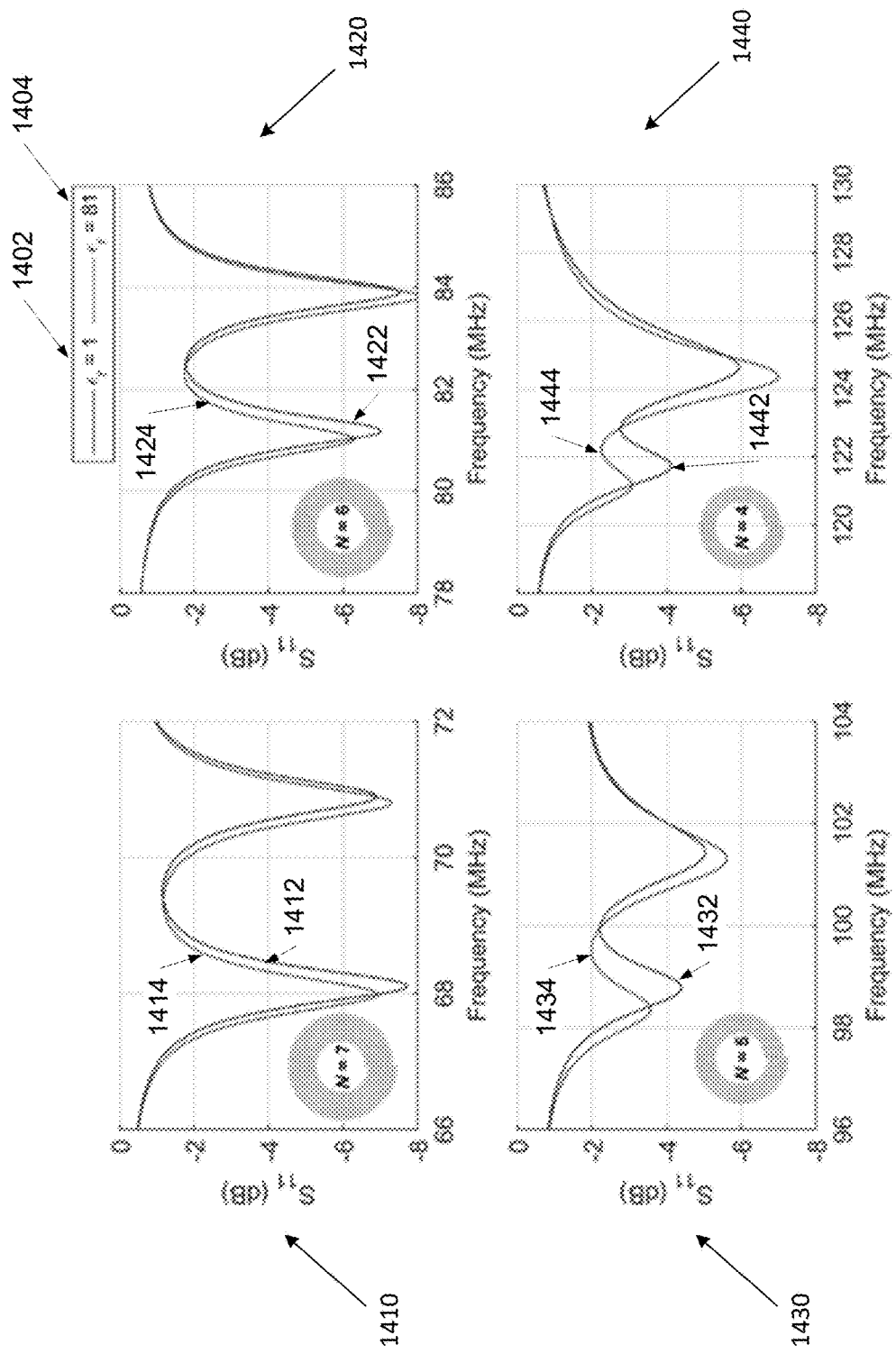
FIG. 14 illustrates the effect of miniaturizing the Tx and Rx coils by reducing the number of turns (N) in accordance with an embodiment of the invention.

The effect of miniaturizing the Tx and Rx coils by reducing the number of turns (N) in accordance with an embodiment of the invention is shown in FIG. 14. Illustrated is the effect of miniaturizing the Tx and Rx coils by reducing the number of turns (N) with the same reader coil and sensor at $d_{23}=55$ mm and $d_{34}=0$ for various relative permittivities of the MUT (i.e., $\epsilon_r=1$ 1402, $\epsilon_r=81$ 1404). The graph 1410 illustrates the effect of miniaturizing Tx and Rx coils with N=7 at MUT permittivities $\epsilon_r=1$ 1412 and $\epsilon_r=81$ 1414. The graph 1420 illustrates the effect of miniaturizing Tx and Rx coils with N=6 at MUT permittivities $\epsilon_r=1$ 1422 and $\epsilon_r=81$ 1424. The graph 1430 illustrates the effect of miniaturizing Tx and Rx coils with N=5 at MUT permittivities $\epsilon_r=1$ 1432 and $\epsilon_r=81$ 1434. The graph 1440 illustrates the effect of miniaturizing Tx and Rx coils with N=4 at MUT permittivities $\epsilon_r=1$ 1442 and $\epsilon_r=81$ 1444. In applications that may need miniaturized Rx and Tx coils, the number of turns may be reduced which may reduce the mutual inductance as well. The limitation may be, however, the magnitude of the $|S_{11}|$ decrease (and yet be detectable). In miniature sensors, the resonance frequency may often be out of the frequency range of conventional VNAs and require additional equipment for measurement. In addition, micro-sized inductors may place limitations on the coupling to the readout coil in a conventional readout system. However, in the magnetically coupled resonance system, the sensor's resonant frequency may be mapped to and indirectly measured through the Rx resonance. This enables translating the sensor's resonant frequency to a simply measurable range. For example, an SRR (with air interlayer) may resonate at 795 MHz but a readout system in accordance with embodiments of the invention enabled it to be measured at 60 MHz (i.e., close to the Rx's natural resonant frequency). Similarly, the Rx/Tx coils may be easily redesigned to drag the sensor's resonance down to the frequency of interest (e.g., NFC range) and enable simple affordable measurements within a practical readout range.

Although specific ex-vivo and in-vivo validation of coupled resonance systems are discussed above with respect to FIGS. 3A-4G, 7, and 11-14, any of a variety of systems including a variety of validation methods and experimental setup and design parameters as appropriate to the requirements of a specific application can be utilized in accordance with embodiments of the invention. Methods and design considerations in accordance with embodiments of the invention are discussed further below.

Methods and Design Considerations

Calculation and measurement of coupled resonances. In many embodiments, the eigenfrequencies of the system (including the real and imaginary parts) may be measured by calculating the eigenvalues of the system matrix. This allows for demonstrating the decay rates and the quality of resonances. To show the measurable resonances at the VNA port, however, without loss of generality and to simplify the demonstration, an $|S_{11}|$ may be calculated from the circuit theory and indicate each resonance's quality by the sharpness of the peaks. In various embodiments, $|S_{11}|$ may be practically measured by VNA (e.g., a Keysight E5063A) linked to the reader coil via the SMA connector. The in-vivo demonstration may be monitored using a miniature VNA (e.g., a mRS miniVNA Tiny).

Coil fabrication and tuning. In several embodiments, a reader, Tx, and Rx coils may be fabricated on dual-layer PCBs. To ensure $k_{12}$ is within the designed range, the reader and Tx may be incorporated into one board. The coupling of reader/Tx and sensor/Rx may result in a slight change of resonance frequency of the Tx and Rx coils. This may occur due to the change of effective inductance and parasitic capacitances between the involving elements. In various embodiments, the Tx and Rx were marginally re-tuned by attaching a small (<10 mm²) aluminum sticker on the back of the PCBs to manipulate the coil's intrinsic parasitic capacitance. In some embodiments, the flexible coils may be fabricated on a flexible self-adhesive vinyl film substrate covered by aluminum foil (e.g., 14 µm thick). The aluminum/vinyl layers may be stacked on an adhesive cutting mat. In some embodiments, the aluminum foil may be cut using the cutting machine Silhouette Cameo 3 (Silhouette America Inc., Lindon, Utah, USA). In some embodiments, the complement pattern of the metal foil may be removed after cutting to form the rings on the vinyl film.

Sensor fabrication and testing. In various embodiments, the sample sensor-SRRs may be fabricated on the vinyl film using the same method detailed at the coil fabrication, described above. In some embodiments, cellulose-based and polyacrylamide (PAAm) hydrogels may be used for RF sensor interlayer whose sensitivity to environmental stimuli (moisture) may be engineered. In some embodiments, an Ecoflex 00-30 may be used as the pressure sensor's interlayer with 1 mm thickness. In some embodiments, top and bottom SRR metals were cut using the aforementioned method and released from the vinyl film by resting in acetone for a few minutes. For pressure sensitivity testing (as shown in FIG. 4E), a lightweight weighing vessel may be placed on top of the sensor, which may be fixed on the human hand. In many embodiments, an applied pressure may be varied by loading a known volume of distilled water, resulting in changes to the spectral response via a shift in the resonant frequency.

Respiration measurement. In a variety of embodiments, an Rx coil may be fixed on top of a shirt worn by a human lying on the bench with the Tx externally fixed above the Rx. The Rx and Tx resonances ($f_{Rx}$ and $f_{Tx}$, respectively) may be recorded over time (once every second), and peak times of their difference may be extracted. The results (shown in FIGS. 4F-G) may then be smoothed using the curve fitting toolbox of MATLAB (e.g., using a smoothing spline method with a smoothing factor of 0.7). In various embodiments, the weighted summation may be calculated by $0.6 \times f_{Rx} + 0.4 \times f_{Tx}$. The weight coefficients may be obtained by minimizing the variation of the summation when no pressure was applied. The weight coefficients may vary based on the system and coil design; however, once tuned, there is typically no need for modifying the coefficients during the measurement.

Numerical methods. In many embodiments, eigenfrequency calculations may be obtained using the eigenvalues function (of the system matrix) in Matlab. Compared to the MATLAB's root solver, this may allow for figuring the real/imaginary correspondence of eigenfrequencies (as shown in FIG. 8). In some embodiments, the FEM simulations may be conducted in Comsol Multiphysics software using electromagnetic waves physics and under frequency-domain studies. In some embodiments, the coupling coefficient versus distance may be obtained by magnetic fields physics under a stationary solver. In some embodiments, the system's equivalent circuit may be validated by Advanced Design System (Keysight Technologies) software.

Although specific methods and design considerations are discussed above, any of a variety of methods and designs as appropriate to the requirements of a specific application can be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A wireless sensor network, comprising:
   a transmitter configured to couple with a reader, wherein the reader provides a multi-spectral readout;
   a receiver configured to couple with a sensor, wherein the sensor is configured to detect at least one parameter and generate sensor data, wherein the sensor data maps onto the receiver;
   wherein the transmitter and the receiver are inductively coupled creating a link between the reader and the sensor;
   wherein the multi-spectral readout comprising a plurality of frequency peaks;
   wherein the multi-spectral readout decouples the sensor data and a distance between the sensor and the reader; and
   wherein the sensor data is generated using a summation of the plurality of frequency peaks and the distance between the sensor and reader is generated using a difference calculated between the plurality of frequency peaks.

2. The wireless sensor network of claim 1, wherein the transmitter comprises a transmitter coil and the receiver comprises a receiver coil.

3. The wireless sensor network of claim 2, wherein the reader comprises a coil and the reader and the transmitter coil are inductively coupled.

4. The wireless sensor network of claim 3, wherein the reader and the transmitter coil are inductively coupled with a coupling strength coefficient of $k_{12}$.

5. The wireless sensor network of claim 2, wherein the sensor comprises at least one circular ring and the receiver coil is further configured to receive the sensor inside of the receiver coil to inductively couple the sensor and the receiver coil.

6. The wireless sensor network of claim 5, wherein the sensor and the receiver coil are inductively coupled with a coupling strength coefficient of $k_{34}$.

7. The wireless sensor network of claim 2, wherein the transmitter coil and the receiver coil are configured coaxially.

8. The wireless sensor network of claim 2, wherein the transmitter coil and the receiver coil are inductively coupled via magnetic resonance.

9. The wireless sensor network of claim 1, wherein the inductive coupling of the transmitter coil and the receiver coil extends a range of the reader and the sensor.

10. The wireless sensor network of claim 1, wherein the inductive coupling of the transmitter coil and the receiver coil creates a low-loss channel.

11. The wireless sensor network of claim 1, wherein the transmitter coil and the receiver coil are inductively coupled with a coupling strength coefficient of $k_{23}$.

12. The wireless sensor network of claim 11, wherein the coefficient $k_{23}$ may be used to determine misalignment of the reader and the sensor.

13. The wireless sensor network of claim 1, wherein the reader is connected to a vector network analyzer ("VNA").

14. The wireless sensor network of claim 1, wherein the sensor is an inductor-resistor-capacitor ("LRC") resonator and the sensor data comprises a spectrum of frequencies.

15. The wireless sensor network of claim 14, wherein the LRC resonator is configured to detect at least one chemical.

16. The wireless sensor network of claim 14, wherein the LRC resonator is configured to detect at least one physical stimulus.

17. The wireless sensor network of claim 1, wherein the sensor comprises a split-ring resonator.

18. The wireless sensor network of claim 17, wherein the split-ring resonator comprises a multifunctional material-under-test ("MUT") configured to detect at least one environmental parameter.

\* \* \* \* \*